US012785386B2

(12) United States Patent
Sorani et al.

(10) Patent No.: US 12,785,386 B2
(45) Date of Patent: Nov. 3, 2026

(54) HIGH-VOLTAGE BATTERY PACK

(71) Applicants: Ningbo Geely Automobile Research & Development Co., Ltd., Ningbo (CN); Zhejiang Geely Holding Group Co., Ltd., Zhejiang (CN)

(72) Inventors: Heza Sorani, Västra Frölunda (SE); Fehmi Fetiu, Gothenburg (SE)

(73) Assignees: Ningbo Geely Automobile Research & Development Co., Ltd, Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 19/007,139

(22) Filed: Dec. 31, 2024

(65) Prior Publication Data

US 2025/0141225 A1 May 1, 2025

Related U.S. Application Data

(63) Continuation of application No. PCT/CN2023/107289, filed on Jul. 13, 2023.

(30) Foreign Application Priority Data

Jul. 19, 2022 (EP) .................................... 22185864

(51) Int. Cl.
*H02J 1/082* (2026.01)
*B60L 50/64* (2019.01)
(Continued)

(52) U.S. Cl.
CPC .............. *H02J 1/082* (2020.01); *B60L 50/64* (2019.02); *H01M 10/613* (2015.04);
(Continued)

(58) Field of Classification Search
CPC .... H02J 1/082; H02J 1/084; H02J 7/34; H02J 7/663; H02J 7/50; B60L 50/64;
(Continued)

(56) References Cited

U.S. PATENT DOCUMENTS 11,258,104 B2 * 2/2022 Chidester ............ H01M 50/574
2017/0001585 A1 1/2017 Fink
(Continued)

FOREIGN PATENT DOCUMENTS

DE 102005038746 A1 3/2007
WO 2022077289 A1 4/2022

OTHER PUBLICATIONS

Extended European Search Report (EESR) from corresponding Application No. 22185864.0, mailed on Jan. 16, 2023, 7 pages.
(Continued)

*Primary Examiner* — Jeffrey M Shin
(74) *Attorney, Agent, or Firm* — Tucker Ellis LLP

(57) ABSTRACT

A high-voltage battery pack for an electrical system includes a high-voltage output terminal configured for being connected to a high-voltage electrical load; a plurality of battery cells connected to form at least one string of series connected battery cells, wherein the battery cells of the at least one string are connected to the high-voltage output terminal for supplying high-voltage electrical power to the high-voltage electrical load; a first low-voltage output terminal configured for being connected to a first low-voltage electrical load, wherein a first subset of the series connected battery cells is configured for supplying low-voltage electrical power to the first low-voltage electrical load; and a second low-voltage output terminal configured for being connected to a second low-voltage electrical load, wherein a second subset of the series connected battery cells is
(Continued)

configured for supplying low-voltage electrical power to the second low-voltage electrical load.

16 Claims, 13 Drawing Sheets

(51) Int. Cl.

| | |
|---|---|
| ***H01M 10/613*** | (2014.01) |
| ***H01M 10/625*** | (2014.01) |
| ***H01M 10/6567*** | (2014.01) |
| ***H01M 50/204*** | (2021.01) |
| ***H01M 50/258*** | (2021.01) |
| ***H01M 50/296*** | (2021.01) |
| ***H01M 50/51*** | (2021.01) |
| ***H02J 1/08*** | (2026.01) |
| ***H02J 7/34*** | (2006.01) |

(52) U.S. Cl.
CPC ..... *H01M 10/625* (2015.04); *H01M 10/6567* (2015.04); *H01M 50/204* (2021.01); *H01M 50/258* (2021.01); *H01M 50/296* (2021.01); *H01M 50/51* (2021.01); *H02J 1/084* (2020.01); *H02J 7/34* (2013.01); *H01M 2220/20* (2013.01)

(58) Field of Classification Search
CPC ............. H01M 10/613; H01M 10/625; H01M 10/6567; H01M 50/204; H01M 50/258; H01M 50/296; H01M 50/51; Y02E 60/10
See application file for complete search history.

(56) References Cited

U.S. PATENT DOCUMENTS

| | | | | |
|---|---|---|---|---|
| 2017/0036545 | A1 | 2/2017 | Lopez De Arroyabe | |
| 2017/0126036 | A1 * | 5/2017 | Dulle ...................... | H02J 7/663 |
| 2019/0273389 | A1 | 9/2019 | Kahnt et al. | |

OTHER PUBLICATIONS

German Language Document XP-002655208 from EESR: Robert Bosch GMBH, “Automotive Electronics; Future on-board Networks”, Oct. 1, 2002, pp. 16-19.

* cited by examiner

HIGH-VOLTAGE BATTERY PACK

RELATED APPLICATION DATA

This application is a continuation of International Patent Application No. PCT/CN2023/107289, filed Jul. 13, 2023, and claims the benefit of European Patent Application No. 22185864.0, filed Jul. 19, 2022, the disclosures of which are incorporated herein by reference in their entireties.

TECHNICAL FIELD

The present disclosure relates to a high-voltage battery pack for an electrical system. The disclosure further relates to a method for supplying high-voltage electrical power and low-voltage electrical power to electrical loads of an electrical system.

The high-voltage battery pack and associated method according to the disclosure will be described primarily in relation to an electric vehicle in form of car, but the high-voltage battery pack is not restricted to this particular type of vehicle, but may as well be installed or implemented in other types of vehicles, such as trucks, buses, rail vehicles, flying vehicles, marine vessels, an off-road vehicle, mining vehicles, agriculture vehicles, working vehicles such as wheel loaders or excavators, forest vehicles such as harvesters or forwarders, motorcycles or the like.

BACKGROUND

In most current type electrical vehicles, such as Battery Electrical Vehicles, Plug-in Hybrid Electrical Vehicles, Hybrid Electrical Vehicle, etc., the vehicle electrical system includes a high-voltage side having a voltage level of for example about 800V, 400V, or a medium-voltage side of for example 48V, and a low-voltage side having a voltage level of about 12V, and a DC/DC converter connecting the high-voltage side with the low-voltage side for enabling power transfer between said sides, in particular for transferring electrical power from the high-voltage side to the low-voltage side.

Furthermore, the automotive industry together with almost all OEMs are moving towards an increasing electrification of vehicles as well as self-driving systems of different levels. This will generally require dual or even more independent power supply and distribution system for fulfilling the redundancy requirements with respect to high safety and ASIL classification (Automotive Safety Integrity Level) on 12V system.

There is always complicity in such redundant power supply systems due to adding more DC/DC converters based on the power rate capacity, packaging, cost, cooling system for power sources, charging strategy and power losses in the DC/DC converters. The dual 12V batteries of the vehicle are typically only used during parking when the DC/DC is off, for enabling maintained power supply to various electrical convenience loads, and during a failure of the DC/DC, for ensuring safe stopping of the vehicle.

There is thus a need for an improved vehicle electrical system that enables high safety and ASIL classification on the 12V system, while reducing the problems associated with installing dual 12V power supply systems and adding more DC/DC converters.

SUMMARY

An object of the present disclosure is to provide a high-voltage battery where the previously mentioned problems are avoided.

According to a first aspect of the present disclosure, there is provided a high-voltage battery pack for an electrical system The high-voltage battery pack comprising: a high-voltage output terminal configured for being connected to a high-voltage electrical load of the electrical system; a plurality of battery cells connected to form at least one string of series connected battery cells, wherein the battery cells of the at least one string are connected to the high-voltage output terminal for supplying high-voltage electrical power to the high-voltage electrical load; a first low-voltage output terminal configured for being connected to a first low-voltage electrical load of the electrical system, wherein a first subset of the series connected battery is configured for supplying low-voltage electrical power to the first low-voltage electrical load; and a second low-voltage output terminal configured for being connected to a second low-voltage electrical load of the electrical system, wherein a second subset of the series connected battery is configured for supplying low-voltage electrical power to the second low-voltage electrical load.

According to a second aspect of the present disclosure, there is provided a method for supplying high-voltage electrical power and low-voltage electrical power to electrical loads of an electrical system. The method comprises providing a high-voltage battery pack having: a high-voltage output terminal, a first low-voltage output terminal, a second low-voltage output terminal, and a plurality of battery cells connected to form at least one string of series connected battery cells, wherein the battery cells of the at least one string are connected to the high-voltage output terminal. The method further comprises: connecting the high-voltage output terminal to a high-voltage electrical load of the electrical system via a high-voltage DC bus of the electric vehicle, for supplying high-voltage electrical power to the high-voltage electrical load; connecting the first low-voltage output terminal to a first low-voltage electrical load of the electrical system via a first low-voltage DC bus of the electrical system, wherein a first subset of the series connected battery cells is configured for supplying low-voltage electrical power to the first low-voltage electrical load via a first low-voltage DC bus of the electrical system; and connecting the second low-voltage output terminal to a second low-voltage electrical load of the electrical system via a second low-voltage DC bus of the electrical system, wherein a second subset of the series connected battery cells is configured for supplying low-voltage electrical power to the second low-voltage electrical load via a second low-voltage DC bus of the electrical system.

In this way, it becomes possible to avoid scaling up the DC/DC capacity or adding more DC/DC units to the system. In addition, it is possible to reduce cable harness between distributed electrical boxes/loads, improve EMI issues, and provide better voltage quality in the electrical system. Furthermore, the solution provides bigger battery capacity and/or energy availability, as well as improved possible to provide power to high transient current spikes. The omission of the DC/DC converters also results in a system having lower weight and reduced cost. Consequently, the battery pack enables an improved vehicle electrical system with high safety and ASIL classification on the 12V system, while reducing the problems caused by installing dual or more DC/DC converters.

Moreover, the high-voltage battery pack enables improved control of the low-voltage side of the electric system because the high-voltage battery is directly connected with the low-voltage DC buses, thereby enabling improved detection and monitoring of operating status, state of health, etc., of the low-voltage electrical loads, instead of merely feeding high-voltage electrical power to a DC/DC converter without direct feedback about the low-voltage side.

In some example embodiments, that may be combined with any one or more of the above-described embodiments, the high-voltage battery pack further comprises a first switching unit having a plurality of electric switches and a second switching unit with a plurality of electric switches, wherein the first switching unit is connected to: the first subset of the series connected battery cells; a third subset of the series connected battery cells; and the first low-voltage output terminal; wherein the first switching unit is operable to selectively connect either the first or the third subset of the series connected battery cells to the first low-voltage output terminal, wherein the second switching unit is connected to: the second subset of the series connected battery cells; a fourth subset of the series connected battery cells; and the second low-voltage output terminal, wherein the second switching unit is operable to selectively connect either the second or the fourth subset of series connected battery cells to the second low-voltage output terminal. Thereby, the high-voltage battery pack provides selectivity of battery cells to be connected to the first and second low-voltage output terminals for enabling supply of different voltage levels and different capacity levels, while enabling redundancy in case of failure of individual battery cells or strings of battery cells.

In some example embodiments, that may be combined with any one or more of the above-described embodiments, a total voltage level of the at least one string of battery cells defines the voltage level supplied at the high-voltage output terminal.

In some example embodiments, that may be combined with any one or more of the above-described embodiments, none of the battery cells of the first subset of series connected battery cells is included in the second subset of series connected battery cells. Thereby, the failure of a battery cell of one of the first and second subsets does not directly harm operation of the other of the first and second subset, thus providing improved redundancy against single-faults.

In some example embodiments, that may be combined with any one or more of the above-described embodiments, none of the battery cells of the third subset of series connected battery cells is included in the fourth subset of series connected battery cells. Thereby, the failure of a battery cell of one of the third and fourth subsets does not directly harm operation of the other of the third and fourth subset, thus providing improved redundancy against single-faults.

In some example embodiments, that may be combined with any one or more of the above-described embodiments, some of the battery cells of the first subset of series connected battery cells is included in the third subset of series connected battery cells, and wherein some of the battery cells of the second subset of series connected battery cells is included in the fourth subset of series connected battery cells. Thereby, each of the first switching units may be arranged to increase or reduce output voltage level by selecting a subset having appropriate number of battery cells and appropriate voltage levels.

In some example embodiments, that may be combined with any one or more of the above-described embodiments, none of the battery cells of the first subset of series connected battery cells is included in the third subset of series connected battery cells, and wherein none of the battery cells of the second subset of series connected battery cells is included in the fourth subset of series connected battery cells. Thereby, improved redundancy against single-faults is provided.

In some example embodiments, that may be combined with any one or more of the above-described embodiments, the plurality of battery cells of the high-voltage battery pack are connected to form at least two individual strings of series connected battery cells, wherein the at least two individual strings of battery cells are connected in parallel. Parallel connected multiple strings provide increased battery capacity.

In some example embodiments, that may be combined with any one or more of the above-described embodiments, the battery cells of the first subset of series connected battery cells are included in a first string of battery cells, and wherein the battery cells of the second subset of series connected battery cells are included in a second string of battery cells. Thereby, failure of one of the first and second strings does not stop low-voltage power supply to at least one of the first and second low-voltage output terminals.

In some example embodiments, that may be combined with any one or more of the above-described embodiments, none of the battery cells of the first subset of series connected battery cells is included in the second string of battery cells, and wherein none of the battery cells of the second subset of series connected battery cells are included in the first string of battery cells. Thereby, failure of one of the first and second strings does not stop low-voltage power supply to at least one of the first and second low-voltage output terminals.

In some example embodiments, that may be combined with any one or more of the above-described embodiments, battery cells of both the first and second strings of battery cells are included in both the first and second subsets of series connected battery cells. Thereby, the first and second subsets have increased energy capacity.

In some example embodiments, that may be combined with any one or more of the above-described embodiments, a total voltage level of the at least one string of battery cells is in the range of 48-2000 Volt, specifically in the range of 200-1500 Volt.

In some example embodiments, that may be combined with any one or more of the above-described embodiments, the at least one string of series connected battery cells includes 20-1000 series connected battery cells, specifically 75-750 series connected battery cells.

In some example embodiments, that may be combined with any one or more of the above-described embodiments, a voltage level of each of the first and second subsets of the series connected batteries is in the range of 10-50 Volt, specifically in the range of 12-48 Volt, and more specifically in the range of 12-18 Volt.

In some example embodiments, that may be combined with any one or more of the above-described embodiments, a cell voltage level of the plurality of battery cells is in the range of 1-5 Volt, specifically in the range of 2.5-4.5 Volt.

In some example embodiments, that may be combined with any one or more of the above-described embodiments, each of the first and second subsets of the series connected batteries include 3-13 battery cells, specifically 3-5 battery cells, per string.

In some example embodiments, that may be combined with any one or more of the above-described embodiments, the first switching unit further is connected to a fifth subset of the series connected battery cells, wherein the first switching unit is operable to selectively connect either the first, third or fifth subset of the series connected battery cells to the first low-voltage output terminal, wherein the second switching unit further is connected to a sixth subset of the series connected battery cells, wherein the second switching unit is operable to selectively connect either the second, fourth or sixth subset of series connected battery cells to the second low-voltage output terminal. Thereby, the high-voltage battery pack provides increased low-voltage power supply flexibility in terms of aspects such as supply voltage level, battery cell selection, etc.

In some example embodiments, that may be combined with any one or more of the above-described embodiments, each of the first and second switching units includes multiple pairs of power transistors, in particular MOSFETs, wherein the power transistors of each pair are connected in series back-to-back. Thereby, each individual switch of the switching units may be controlled by an electronic switching unit controller for providing controlled bi-directional current flow through the switch.

In some example embodiments, that may be combined with any one or more of the above-described embodiments, the first and second switching units have identical electrical design and functionality. This provides reduced cost and complexity of the switching units, and simplifies control of the switches of first and second switching units.

In some example embodiments, that may be combined with any one or more of the above-described embodiments, each of the first and second switching units has an electronic switching unit controller operably connected to the switches of the first and second switching units, respectively, and wherein the high-voltage battery pack comprises an electronic battery pack controller that is connected to the first and second switching units via a data communication channel and configured for submitting control instructions to the first and second switching units. Thereby, a more decentralized layout of the control structure is provided, that is more easily implemented In some example embodiments, that may be combined with any one or more of the above-described embodiments, the first switching unit has at least four individually controllable switches, wherein an input of a first switch is connected to a first position along the at least one string of series connected battery cells and an output of the first switch is connected to a negative pole of the first low-voltage output terminal, wherein an input of a second switch is connected to a second position along the at least one string of series connected battery cells and an output of the second switch is connected to a positive pole of the first low-voltage output terminal, wherein the first and second positions jointly define the first subset of the series connected battery cells, such that the voltage level of the first subset of the series connected battery cells is supplied at the first low-voltage output terminal when the first and second switches are set in a conducting state, wherein an input of a third switch is connected to a third position along the at least one string of series connected battery cells and an output of the third switch is connected to the negative pole of the first low-voltage output terminal, wherein an input of a fourth switch is connected to a fourth position along the at least one string of series connected battery cells and an output of the fourth switch is connected to a positive pole of the first low-voltage output terminal, and the third and fourth positions jointly define the third subset of the series connected battery cells, such that the voltage level of the third subset of the series connected battery cells is supplied at the first low-voltage output terminal when the third and fourth switches are set in a conducting state.

In some example embodiments, that may be combined with any one or more of the above-described embodiments, the second switching unit has at least four individually controllable switches, wherein an input of a first switch is connected to a fifth position along the at least one string of series connected battery cells and an output of the first switch is connected to a negative pole of the second low-voltage output terminal, wherein an input of a second switch is connected to a sixth position along the at least one string of series connected battery cells and an output of the second switch is connected to a positive pole of the second low-voltage output terminal, wherein the fifth and sixth positions jointly define the second subset of the series connected battery cells, such that the voltage level of the second subset of the series connected battery cells is supplied at the second low-voltage output terminal when the first and second switches are set in a conducting state, wherein an input of a third switch is connected to a seventh position along the at least one string of series connected battery cells and an output of the third switch is connected to the negative pole of the second low-voltage output terminal, wherein an input of a fourth switch is connected to an eighth position along the at least one string of series connected battery cells and an output of the fourth switch is connected to a positive pole of the second low-voltage output terminal, and wherein the seventh and eighth positions jointly define the fourth subset of the series connected battery cells, such that the voltage level of the fourth subset of the series connected battery cells is supplied at the second low-voltage output terminal when the third and fourth switches are set in a conducting state.

In some example embodiments, that may be combined with any one or more of the above-described embodiments, the high-voltage battery pack further comprises a third switching unit having a plurality of electric switches, and a third low-voltage output terminal, wherein the third switching unit is connected to: the fifth subset of the series connected battery cells, a sixth subset of the series connected battery cells, and the third low-voltage output terminal; wherein the third switching unit is operable to selectively connect either the fifth or the sixth subset of the series connected battery cells to the third low-voltage output terminal. A third low-voltage output terminal provides additional flexibility for supply of low-voltage power to the various low-voltage loads.

In some example embodiments, that may be combined with any one or more of the above-described embodiments, the high-voltage battery pack is free from a DC/DC converter. This enables reduced cost and reduced weight of the electrical system.

In some example embodiments, that may be combined with any one or more of the above-described embodiments, the first and second switching units are integrated in the high-voltage battery pack. This provides a compact and easily installed unit.

In some example embodiments, that may be combined with any one or more of the above-described embodiments, an internal liquid cooling circuit of the high-voltage battery pack is configured for cooling also the first and second switching units. This provides a compact and cost-efficient design.

In some example embodiments, that may be combined with any one or more of the above-described embodiments, the high-voltage battery pack comprises a plurality of individual high-voltage battery modules, each including at least one of said strings of series connected battery cells and a high-voltage output connection connected to the at least one string, wherein the high-voltage output connections of the plurality of high-voltage battery modules are connected in parallel and coupled to the high-voltage output terminal of the high-voltage battery pack, wherein at least one of said plurality of high-voltage battery modules comprises: a first low-voltage output connection connected to the first low-voltage output terminal of high-voltage battery pack, and said first subset of the series connected battery cells connected to the first low-voltage output connection; wherein at least one of said plurality of high-voltage battery modules comprises: a second low-voltage output connection connected to the second low-voltage output terminal of high-voltage battery pack, and said second subset of the series connected battery cells connected to the second low-voltage output connection. This provides a modular and scalable design of the high-voltage battery pack that is easily adapted to various implementations.

The present disclosure also concerns an on-board electrical system for an electric vehicle comprising a high-voltage battery pack as described above, wherein the high-voltage output terminal of the high-voltage battery pack is connected to a high-voltage electrical load of the electrical system via a high-voltage DC bus of the electric vehicle; wherein the first low-voltage output terminal of the high-voltage battery pack is connected to a first low-voltage electrical load of the electrical system via a first low-voltage DC bus of the electrical system; and wherein the second low-voltage output terminal of the high-voltage battery pack is connected to a second low-voltage electrical load of the electrical system via a second low-voltage DC bus of the electrical system.

In some example embodiments, that may be combined with any one or more of the above-described embodiments, the on-board electrical system is free from a DC/DC converter arranged between the high-voltage DC bus and any of the first and second low-voltage DC buses.

In some example embodiments, that may be combined with any one or more of the above-described embodiments, the on-board electrical system further comprises: a first master electronic control unit connected to the first low-voltage DC bus; and a second master electronic control unit connected to the second low-voltage DC bus. Thereby, the low-voltage power supply has improved redundancy.

In some example embodiments, that may be combined with any one or more of the above-described embodiments, the on-board electrical system further comprises: a first low-voltage battery connected to the first low-voltage DC bus; and a second low-voltage battery connected to the second low-voltage DC bus. Thereby, the low-voltage power supply has improved redundancy.

In some example embodiments, that may be combined with any one or more of the above-described embodiments, the electrical system is free from a low-voltage battery connected to the first or second low-voltage DC buses. Thereby, weight and cost associated with a low-voltage battery for each low-voltage bus is eliminated.

In some example embodiments, that may be combined with any one or more of the above-described embodiments of the method described above, the high-voltage battery pack comprises a first switching unit having a plurality of electric switches and a second switching unit with a plurality of electric switches, the first switching unit is connected to: the first subset of the series connected battery cells, a third subset of the series connected battery cells, and the first low-voltage output terminal, and the second switching unit is connected to the second subset of the series connected battery cells, a fourth subset of the series connected battery cells, and the second low-voltage output terminal, the method comprises: controlling the first switching unit to selectively connect either the first or the third subset of the series connected battery cells to the first low-voltage output terminal; and controlling the second switching unit to selectively connect either the second or the fourth subset of series connected battery cells to the second low-voltage output terminal. Thereby, the high-voltage battery pack provides selectivity of battery cells to be connected to the first and second low-voltage output terminals for enabling supply of different voltage levels and different capacity levels, while enabling redundancy in case of failure of individual battery cells or strings of battery cells.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The high-voltage battery pack and method for supplying high-voltage electrical power and low-voltage electrical power to electrical loads of an electrical system according to the disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
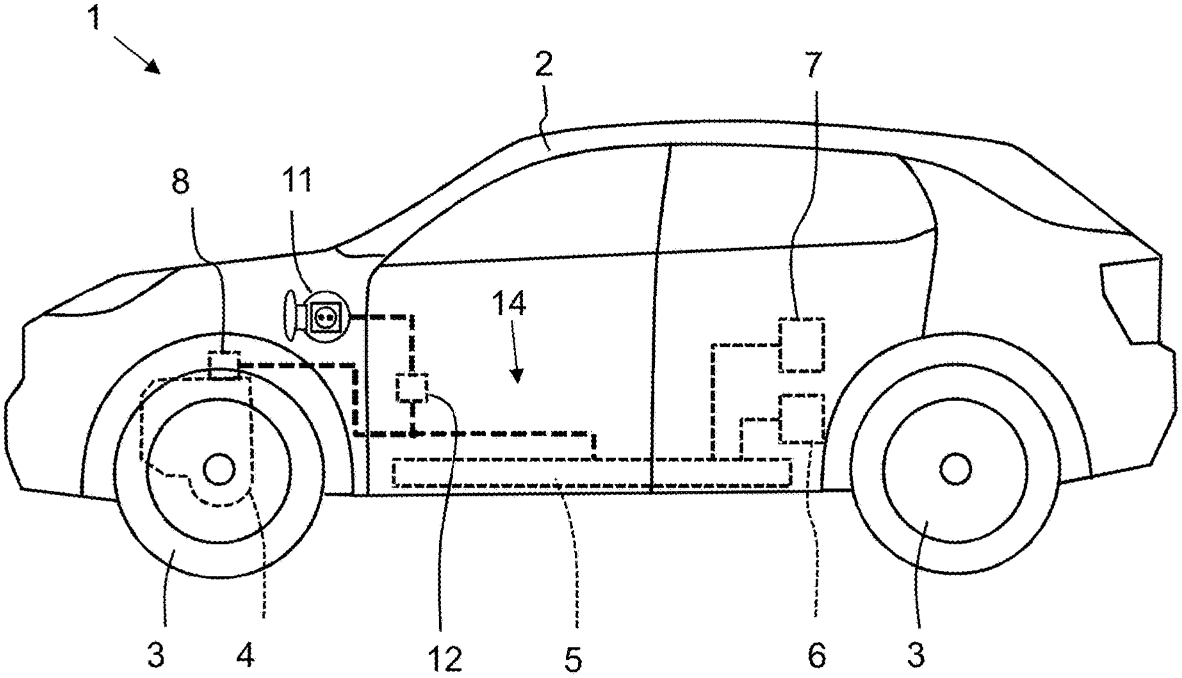
FIG. 1 shows schematically a side-view of a vehicle having a high-voltage battery pack according to the disclosure.

For the purpose of setting the high-voltage battery pack according to the disclosure in a context, FIG. 1 schematically shows a side view of an example electrical vehicle 1, such as a car, having high-voltage battery pack 5 according to the disclosure. Similarly, FIG. 2 shows a more detailed example embodiment of an on-board electrical system 14 including the high-voltage battery pack 5.

Figure 2:
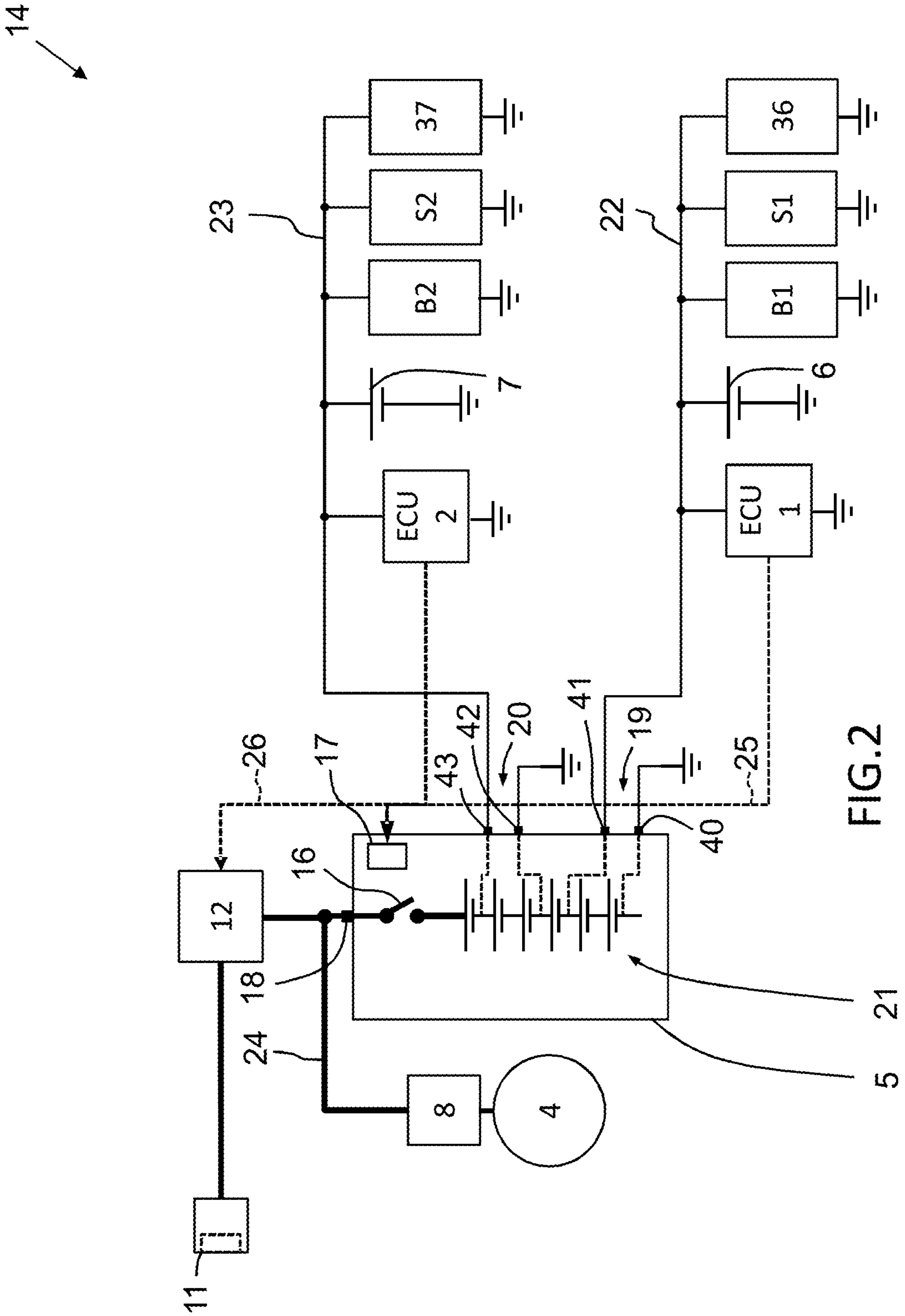
FIG. 2 shows schematically a vehicle electrical system including the high-voltage battery pack according to the disclosure.

With reference to FIGS. 1 and 2, the vehicle 1 may have a body 2, front and rear wheels 3 and on-board electrical system 14 including the high-voltage battery pack 5 according to the present disclosure. The on-board electrical system 14 further comprises an electric propulsion motor 4 drivingly connected to one or more wheels 3, a first low-voltage (LV) battery pack 6, and a second low-voltage (LV) battery pack 7.

The provision of parallel connected redundant first and second low-voltage battery packs 6, 7 provides improved fault tolerance against various power supply failure scenarios, thereby enabling increased operational safety to various safety critical low-voltage loads that are connected to said first and second low-voltage battery packs 6, 7.

The electric propulsion motor 4 may for example be a single-phase or multi-phase AC motor or a DC-motor, and the vehicle 1 may include more than one propulsion motor 4 for enabling for example all-wheel drive, torque vectoring, wheel hub motors, or the like.

The electric propulsion motor 4 is connected to the high-voltage battery pack 5 via a motor controller 8, such as for example an inverter.

The HV battery pack 5 comprises a plurality of electrochemical battery cells. For example, the HV battery may be a Lithium-Ion battery having a certain nominal voltage level, such as for example at least 24 Volt, specifically at least 200V. In some example embodiments, the nominal voltage level of the HV battery be in the range of 200-2000 V. The HV battery pack 5 may additionally, or alternatively, include one or more super capacitors.

Each of the first and second LV battery packs 6, 7 may for example include a battery, such as a 12 volt battery. The LV battery packs 6, 7 may for example include Lead-Acid batteries, Lithium-Ion batteries, or some other type of batteries. Each of the LV battery packs 6, 7 may additionally, or alternatively, include one or more super capacitors.

The illustrated example embodiment of the vehicle 1 and on-board electrical system 14 further comprises an on-board charging inlet 11 and an on-board charger 12. The on-board charging inlet 11 may for example be an electric socket easily accessible on the outside of the vehicle 1 and configured to receive an electric charging plug or charging connector of a stationary external charging unit. Such stationary charging units are for example available at public charging stations or at the home, and they are connected to the electric power grid. Alternatively, the on-board charging inlet may be part of a wire-less charging pad arrangement configured for receiving electric power from the electric grid wirelessly, e.g. by inductive power transfer from a stationary ground pad to vehicle mounted receiving pad.

The on-board charger 12 is operably connected to the on-board charging inlet 11 and to the high-voltage battery pack 5 for converting the received electrical power from the grid to a form suitable for charging of the high-voltage battery pack 5 and first and second LV electrical storage systems 6, 7.

However, in some example embodiments, the vehicle 1 and on-board electrical system 14 may lack an on-board charging inlet 11 and an on-board charger 12, e.g. for non-plug-in electric vehicles.

The high-voltage battery pack 5 may include an electronic battery pack controller 17 configured for controlling operation of the high-voltage battery pack 5, such as handling data communication with other parts of the on-board electrical system 14, controlling operation of a main high-voltage switch 16, controlling battery cell charge equalization, monitoring charge/discharge current, battery state of charge and battery temperature levels, etc.

The on-board electrical system 14 further comprises a first low-voltage battery 6 and a second low-voltage battery 7. The first and second low-voltage batteries 6, 7 provide a redundant low-voltage power supply. This is may be required in drive-by-wire systems. Furthermore, level 3-5 of autonomous vehicles (AVs) must generally be designed to have appropriate levels of fault tolerance in hardware, and this is accomplished by redundant low-voltage power supply to certain safety critical electrical loads, such as for example electric steering system, electric braking system, obstacle detection system, navigation system, electronic controllers, the like.

For example, a redundant vehicle braking system may include first and second braking modules B1, B2, each powered by an individual low-voltage battery 6, 7, such that failure of one of the low-voltage batteries 6, 7, or one of the braking modules B1, B2, will not prevent the vehicle from having operational braking capacity, namely by means of the other, fault-free, low-voltage battery 6, 7 or braking module B1, B2. Each of the first and second braking modules B1, B2 may for example include an electronic braking controller and/or a braking actuator.

Similarly, a redundant vehicle steering system may include first and second steering modules S1, S2, each powered by an individual low-voltage battery 6, 7, such that failure of one of the low-voltage batteries 6, 7, or one of the steering modules S1, S2 will not prevent the vehicle from having operational steering capacity, namely by means of the other, fault-free, low-voltage battery 6, 7, or steering module S1, S2. Each of the first and second steering modules S1, S2 may for example include an electronic braking controller and/or a steering actuator.

The vehicle may also need redundant master electronic control units for enabling fault-tolerant control of the various parts and systems of the vehicle. These redundant master control units are herein referred to as first and second master electronic control units ECU1, ECU2. The first master electronic control unit ECU1 is configured to receive electrical power from for first low-voltage battery 6, and the second master electronic control unit ECU2 is configured to receive electrical power from for second low-voltage battery 7.

In the example embodiment of FIG. 2, the first master electronic control unit ECU1 is configured to control operation of and/or communicate with, for example the on-board charger 12 and/or the high-voltage battery controller 17, via a first data communication line 25, which reflects a data communication channel, such as a data bus or the like. Furthermore, the second master electronic control unit ECU2 is configured to control operation of and/or communicate with, for example the on-board charger 12 and/or the high-voltage battery controller 17, via a second data communication line 26, which reflects a data communication channel, such as a data bus or the like.

In other words, the first low-voltage battery 6 may be connected to, and configured to supply electrical power to, a first low-voltage DC bus 22, and various electrical loads may be connected to the first low-voltage DC bus 22, such as the first master electronic control unit ECU1, the first steering module S1 and/or or the first braking module B1. Similarly, the second low-voltage battery 7 may be connected to, and configured to supply electrical power to, a second low-voltage DC bus 23, and various electrical loads may be connected to the second low-voltage DC bus 23, such as the second master electronic control unit ECU2, the second steering module S2 and/or or the second braking module B2.

Other low-voltage electrical loads 36, 37 may also be connected to the first or second low-voltage DC buses 22, 23.

Figure 3:
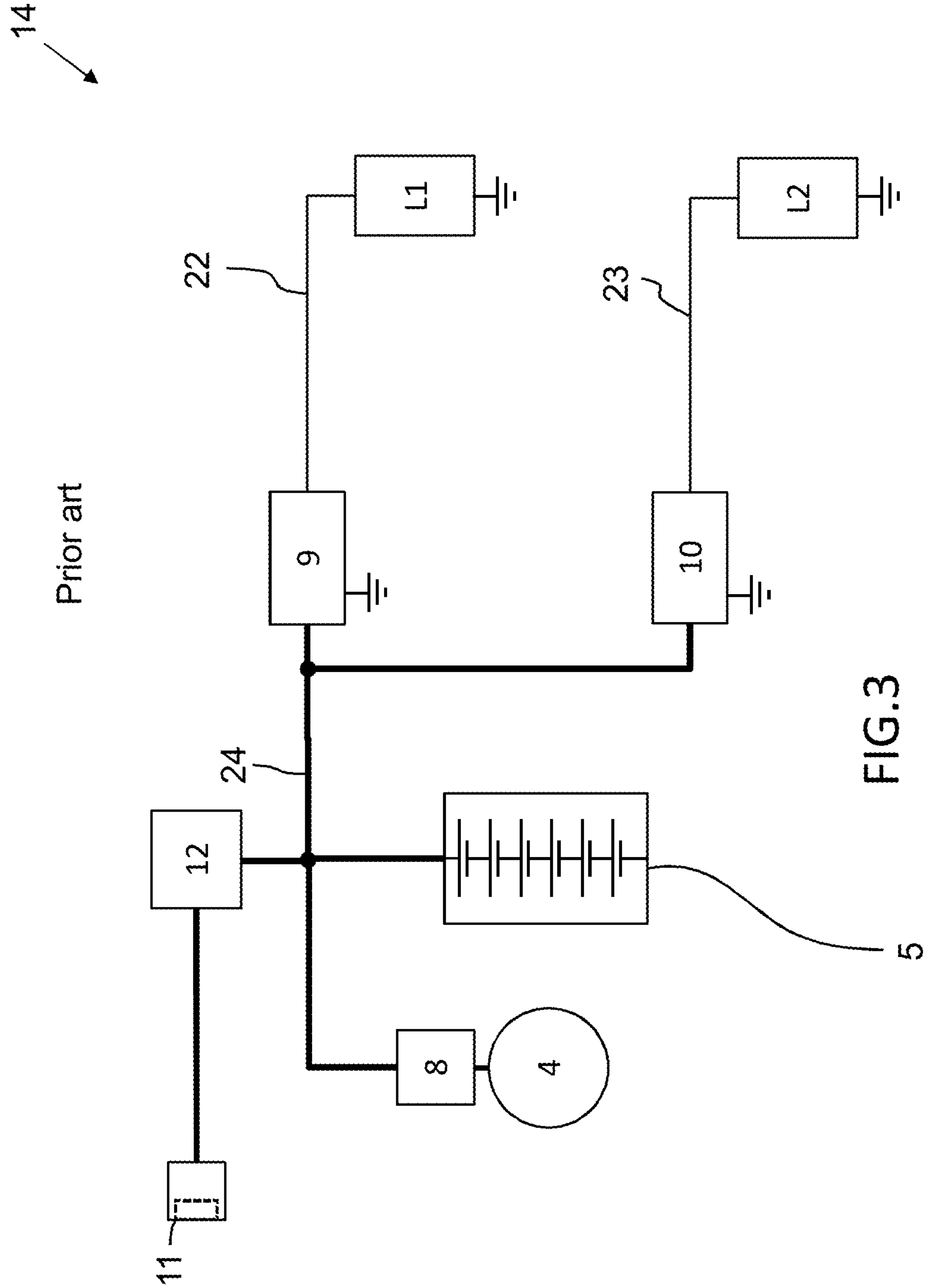
FIG. 3 shows schematically a prior art vehicle electrical system.

In the prior art on-board electrical systems 14, as schematically illustrated in FIG. 3, the high-voltage battery pack 5 may be connected to the first low-voltage DC bus 22 via a first DC/DC converter 9 and to the second low-voltage DC bus 23 via a second DC/DC converter 10, such that a certain level of power supply redundancy to first and second loads L1, L2 is accomplished.

However, in the on-board electrical system 14 and high-voltage battery pack 5 according to the present disclosure, as schematically illustrated in FIG. 2, the high-voltage battery pack 5 is instead provided with integrated first and second low-voltage output terminals 19, 20, each individually connected to subsets of one or more strings 21 of series connected battery cells for providing the desired low-voltage output level. Hence, instead of scaling up and/or increasing the number of DC/DC converters, the high-voltage battery 5 is designed to provide redundant low-voltage output directly from the high-voltage battery 5 to the first and second low-voltage DC buses 22, 23, without requiring any DC/DC converters for this purpose.

In other words, the on-board electrical system for an electric vehicle 1 according to the present disclosure comprises a high-voltage battery pack 5 having a high-voltage output terminal 18 connected to a high-voltage electrical load, such as an inverter 8 or electric propulsion motor 4 of the electrical system, via a high-voltage DC bus 24 of the electric vehicle 1. The a high-voltage battery pack 5 further includes first and second low-voltage output terminals 19, 20, wherein a positive pole 41 of the first low-voltage output terminal 19 is connected to a first low-voltage electrical load, such as a first braking module B1 and/or a first steering module S1 of the electrical system, via the first low-voltage DC bus 22 of the electrical system, and wherein the second low-voltage output terminal 20 is connected to a second low-voltage electrical load, such as a second braking module B2 and/or a second steering module S2 of the electrical system, via a second low-voltage DC bus 23 of the electrical system.

As schematically illustrated in FIG. 2, the on-board electrical system may thus be free from a DC/DC converter arranged between the high-voltage DC bus 24 and any of the first and second low-voltage DC buses 22, 23.

According to some example embodiments, the on-board electrical system further comprises a first master electronic control unit ECU1 connected to the first low-voltage DC bus 22, a second master electronic control unit ECU2 connected to the second low-voltage DC bus 23.

According to some example embodiments, the on-board electrical system further comprises a first low-voltage battery 6 connected to the first low-voltage DC bus 22, and a second low-voltage battery 7 connected to the second low-voltage DC bus 23.

In some example embodiments, low-voltage power to the first and second low-voltage DC buses 22, 23 is normally supplied primarily from the first and second low-voltage output terminals 19, 20, and the first and second low-voltage batteries 6, 7 are primarily kept in a fully charged state and ready for use in case of failure of the high-voltage battery pack 5, or the like.

However, in some example embodiments of the electrical system 14, the first and second low-voltage batteries 6, 7 may even be omitted, i.e. the electrical system may be free from a low-voltage battery connected to the first or second low-voltage DC buses 22, 23, thereby reducing cost and complexity of the electrical system 14.

The high-voltage DC bus 24 and first and second low-voltage DC buses 22, 23 may be implemented in various alternative ways. For example, one or more of the DC buses 22-24 may be implemented in form of a rigid or flexible electrical conductor arrangement joining all relevant electrical components/loads of the bus. Alternatively, one or more of the DC buses 22-24 may be implemented in form of power distribution Unit (PDU) or junction box or the like that interconnects some or all of the electrical components/loads of the bus. In other words, in electric and hybrid electric vehicle applications, a high-voltage or low-voltage DC bus generally refers to conductor installation that enables multiple electric devices, such as power sources, power converter units, energy storage systems, loads, etc., to be inter-connected and to share electrical power among each other.

Thereby, the first and second low-voltage DC buses 22, 23 are normally, i.e. during normal operation, galvanically and electrically disconnected from each other, for avoiding that a failure, such as a short-circuit or the like, in one of the low-voltage DC buses 22, 23 does not harm of the correct operation or functioning of the other of the low-voltage DC buses 22, 23.

The first master electronic control unit ECU1 may be configured for controlling operation of at least some of the electrical loads connected to the first low-voltage DC bus 22, and the second master electronic control unit ECU2 may be configured for controlling operation of at least some of the electrical loads connected to the second low-voltage DC bus 23.

The schematic layout of the on-board electrical system 14 of FIG. 2 represents merely one example embodiment, and many variants are possible within the scope of the present disclosure. For example, the various electrical components may be more or less integrated in larger structures. Such integration of components may be cost-effective in terms of enabling a more compact design and sometimes also shared utilization of certain components, such as high-voltage switches etc.

Figure 4:
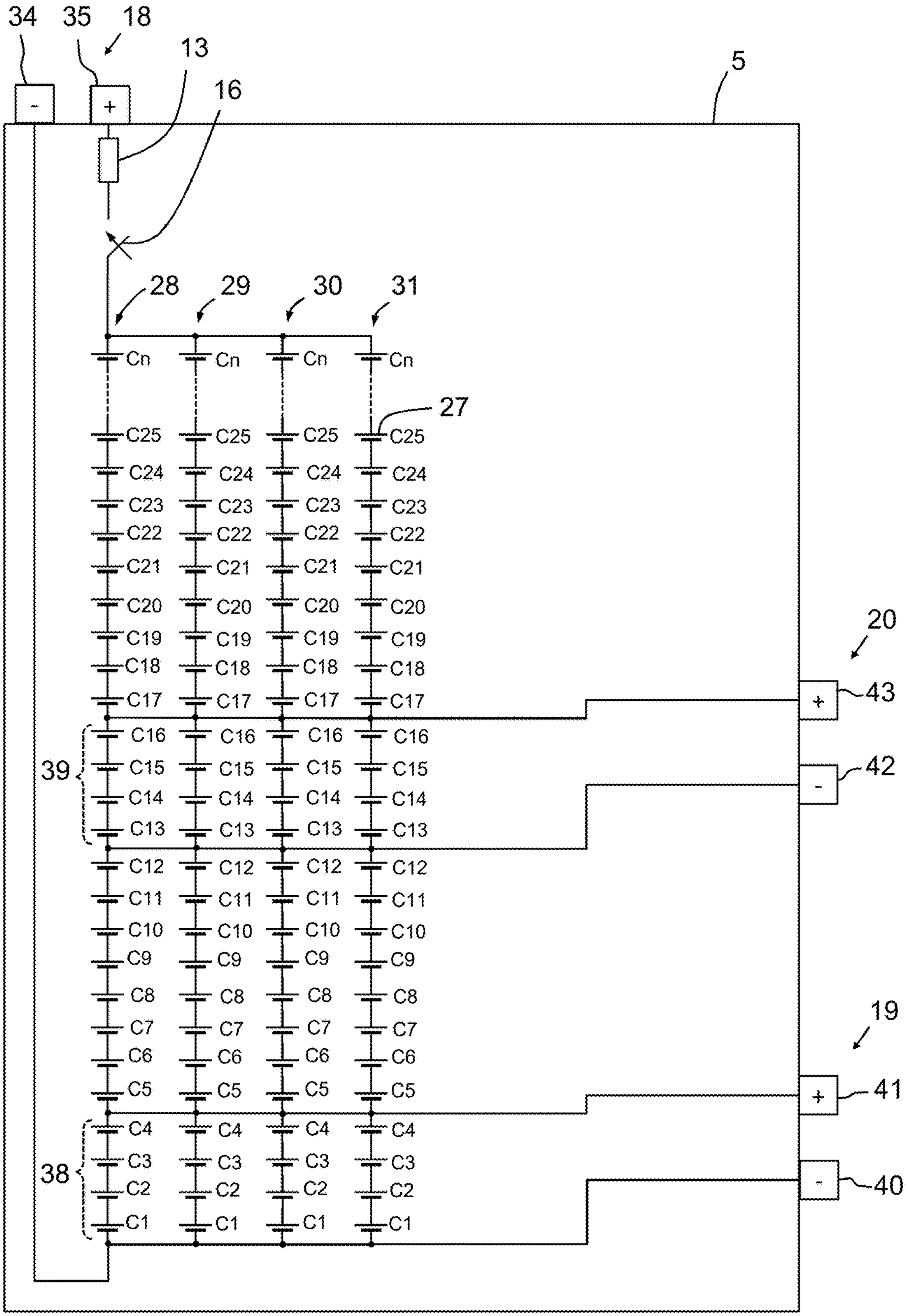
FIG. 4 shows schematically a first example embodiment of the high-voltage battery pack according to the disclosure.

FIG. 4 shows schematically a first example embodiment of the high-voltage battery pack 5 for an electrical system 14, in particular for a vehicle electrical system 14. With reference to FIG. 2 and FIG. 4, the high-voltage battery pack 5 comprises a high-voltage output terminal 18 configured for being connected to a high-voltage electrical load 4, 8 of the electrical system, in particular via the high-voltage DC bus 24 of the electric vehicle 1. The high-voltage battery pack 5 further comprises a plurality of battery cells 27 connected to form a plurality of strings 28, 29, 30, 31 of series connected battery cells 27, wherein the battery cells 27 of the plurality of strings are connected to the high-voltage output terminal 18 for supplying high-voltage electrical power to the high-voltage electrical load 8. In particular, first and second battery end cells C1, Cn of one or more strings 28, 29, 30, 31 of battery cells 27 are connected to the high-voltage output terminal 18.

Specifically, a negative pole of the first battery end cell C1 of the one or more strings 28, 29, 30, 31 of battery cells 27 may be connected to a negative pole 34 of the high-voltage output terminal 18, and a positive pole of the second battery end cell Cn of the one or more strings 28, 29, 30, 31 of the battery cells 27 may be connected to a positive pole 35 of the high-voltage output terminal 18.

The negative pole of first battery end cells C1 of the four strings 28, 29, 30, 31 of battery cells 27 are interconnected, and the positive pole of the second battery end cells Cn of the four strings 28, 29, 30, 31 of battery cells 27 are interconnected, such that the battery pack consists of serial and parallel connected battery cells 27.

The number of series connected battery cells in each string, times the nominal voltage level of each battery cell, determines the resulting total voltage level of the high-voltage battery pack 5, and the capacity of the high-voltage battery 5 is determined by the capacity of each battery cell times the total number of battery cells in the pack.

For example, a high-voltage battery pack 5 having 100 cells connected in series to form a string, wherein each battery cell having a nominal voltage level of 4 V, results in a high-voltage battery pack having nominal supply voltage 400V.

Similarly, a high-voltage battery pack including 50 strings of series connected battery cells, wherein each string including 100 battery cells, results in 5000 battery cells, and when the capacity of each battery cell for example is 3 Ah, the cell energy is 3 Ah×4 V=12 Wh, such that the total capacity of the high-voltage battery pack is 12 Wh/cell×5000 cells, which is equal to 60 KWh.

In FIG. 4, only the 1st to 25th battery cells 27 of each string 28, 29, 30, 31 are illustrated in detail. However, the total number of battery cells within each string of series connected battery cells 27 may for example be around 20-200 battery cells, depending on the type and voltage level of the battery cells.

The high-voltage battery pack 5 further comprises a first low-voltage output terminal 19 configured for being connected to a first low-voltage electrical load B1, S1, 36 of the electrical system 14 via the first low-voltage DC bus 22 of the electrical system, wherein a first subset 38 of the series connected battery cells C1-Cn is configured for supplying low-voltage electrical power to the first low-voltage electrical load B1, S1, 36 via the first low-voltage DC bus. In addition, the high-voltage battery pack 5 comprises a second low-voltage output terminal 20 configured for being connected to a second low-voltage electrical load B2, S2, 37 of the electrical system via a second low-voltage DC bus 23 of the electrical system, wherein a second subset 39 of the series connected battery cells C1-Cn is configured for supplying low-voltage electrical power to the second low-voltage electrical load B2, S2, 37 via the second low-voltage DC bus.

In the example embodiment of FIG. 4, the first subset 38 includes four series connected battery cells C1-C4 from each of the first to fourth strings 28, 29, 30, 31, and the second subset 39 includes four series connected battery cells C13-C16 from each of the first to fourth strings 28, 29, 30, 31. However, design parameters such as the number of battery cells C1-Cn included in the subset, the position of the battery cells C1-Cn within the strings 28-31, and the number of strings 28-31 may be altered, depending on the circumstances, the specific implementation, the required battery capacity, the required voltage level of each individual low-voltage DC bus 22, 23.

For example, the first and/or second subset 38, 39 may alternatively include another number of battery cells, such as three, five, or six series connected battery cells 27, depending on the requested voltage level of the low-voltage supply. Similarly, the capacity of the low-voltage supply may be varied by including parallel connected battery cells 27 from an appropriate number of strings, such as one, two, three or more or all strings of the high-voltage battery pack 5. The first and second subset 38, 39 may also include different number of cells 27, and include different number of strings.

Moreover, the high-voltage battery pack 5 is typically relatively large and it may be desirable to position the first and second low-voltage output terminals 19, 20 at a location close the low-voltage electrical loads S1, B1, 36, S2, B2, 37 of each specific low-voltage DC bus 22, 23, for the purpose of reducing the amount of necessary cable harness. Consequently, it may be beneficial to select first and second subsets 38, 39 of series connected battery cells of the high-voltage battery 5 that are located close to the position of the low-voltage electrical loads S1, B1, 36, S2, B2, 37.

A subset of series connected battery cells refers to a set of consecutive cells of one or more strings, i.e. neighboring cells connected in series with each other.

A negative pole 40 of first low-voltage output terminal is connected to a negative side of the series connected battery cells C1-C4 of the first subset 38, and a positive pole 41 of first low-voltage output terminal is connected to a positive side of the series connected battery cells C1-C4 of the first subset 38. Correspondingly, a negative pole 42 of second low-voltage output terminal is connected to a negative side of the series connected battery cells C13-C16 of the second subset 39, and a positive pole 43 of second low-voltage output terminal is connected to a positive side of the series connected battery cells C13-C16 of the second subset 39.

Figure 5:
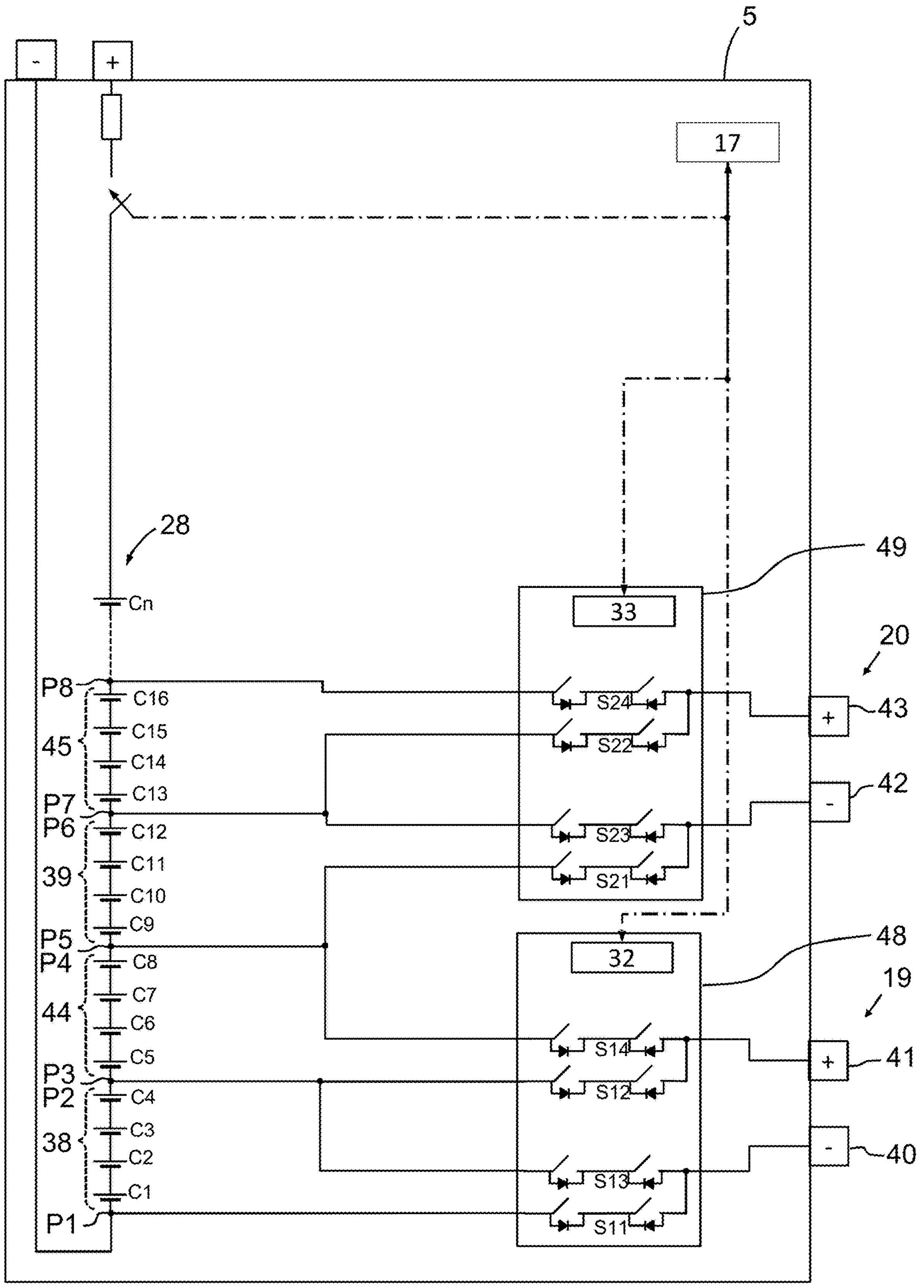
FIG. 5 shows schematically a further example embodiment of the high-voltage battery pack according to the disclosure.

FIG. 5 shows a further example embodiment of the layout of the high-voltage battery pack 5 including a first switching unit 48 and a second switching unit 49 for enabling selective interconnection of the first and second low-voltage output terminals 18, 19 with various different subsets of series connected battery cells, thereby providing improved redundancy, low-voltage power supply reliability to each low-voltage DC.

FIG. 5 merely shows a first battery string 28 but the high-voltage battery 5 may include further battery strings connected in parallel with the first battery string 28, and the first and second switching units 48, 49 may be connected to any number of said further battery strings for providing increased capacity low-voltage power supply at the first and second low-voltage output terminals 19, 20.

In the example embodiment of FIG. 5, each of the first and second switching units 48, 49 has at four individually controllable switches S11-S14, S21-S24. The switches S11-14, S21-S24 may be implemented using any type of electronically controlled switches, such as in particular using power transistors due to their low cost and small size. However, the switches S11-14, S21-S24 may alterative be implemented using relays or other types of switching technologies.

According to some example embodiments, as schematically shown in FIGS. 5 to 10, each of the switches S11-16, S21-S26 may be implemented as a bidirectional switch formed by using two oppositely arranged power transistors, thereby providing both reverse and forward voltage-blocking capabilities by having their body diodes facing opposite directions. Moreover, by designing and implementing the switching units 48, 49 with a plurality of power transistors arranged in a Back-To-Back layout with independent control, high ASIL integrity and operational safety is provided by monitoring and diagnostics if any error would occur. However, each of the switches S11-16, S21-S26 may alternatively be implemented using a single power transistor, for example in designs when no bidirectional functionality is required, or when reverse voltage-blocking capability is provided by other means.

Each of the switches S11-16, S21-S26 is herein referred to as a single switch even the switch in some embodiments may be implemented by two oppositely arranged transistors.

Figure 6:
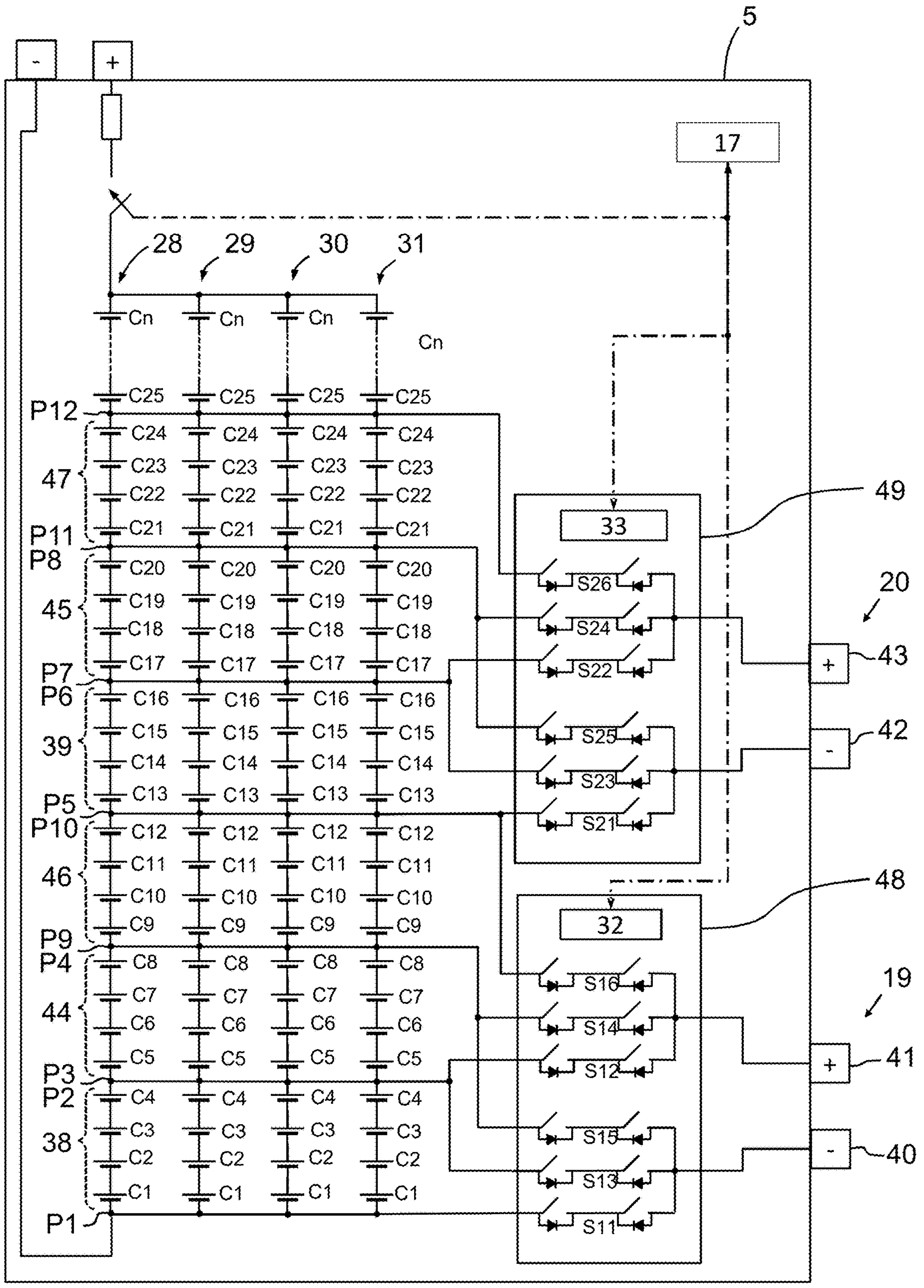
FIG. 6 shows schematically a further example embodiment of the high-voltage battery pack according to the disclosure.

Each of the first and second switching units 48, 49 may be implemented using a number of switches required for providing the desired functionality. For example, the high-voltage battery pack 5 of FIG. 5 includes four switches S11-14, S21-S24 in each of the first and second switching units 48, 49, thereby enabling connection of two different subsets of series connected battery cells to each of the first and second low-voltage output terminals 48, 49. According to another example embodiment, as shown in FIG. 6, the high-voltage battery pack 5 includes six switches S11-16, S21-S26 in each of the first and second switching units 48, 49, thereby enabling connection of three different subsets of series connected battery cells to each of the first and second low-voltage output terminals 48, 49.

In other, non-showed example embodiments, the high-voltage battery pack 5 may include larger number of switches in each switching units, thereby enabling connection of larger number of individual subsets of series connected battery cells to each low-voltage output terminal. For example, the high-voltage battery pack 5 may include about 4-300, specifically 4-50, number of switches in each switching unit, thereby enabling connection of about 2-150, specifically 2-25, individual subsets of series connected battery cells to each low-voltage output terminal. Moreover, the number of switches in each switching units does not have to be same, but may vary depending to the needs of each low-voltage DC bus.

With reference to FIG. 5, an input of the first switch S11 of the first switching unit 48 is connected to a first position P1 along the first battery string 28 and an output of the first switch S11 of the first switching unit 48 is connected to the negative pole 40 of the first low-voltage output terminal 19. An input of a second switch S12 of the first switching unit 48 is connected to a second position P2 along the first battery string 28 and an output of the second switch S12 of the first switching unit 48 is connected to the positive pole 41 of the first low-voltage output terminal 19. The first and second positions P1, P2 jointly define the first subset 38 of the series connected battery cells C1-C4, such that the voltage level of the first subset 38 of the series connected battery cells C1-C4 is supplied at the first low-voltage output terminal 19 when the first and second switches are set in a conducting state, i.e. when a supply current may circulate through the first and second switches S11, S12 of the first switching unit 48.

Furthermore, an input of a third switch S13 of the first switching unit 48 is connected to a third position P3 along the first battery string 28 and an output of the third switch S13 of the first switching unit 48 is connected to the negative pole 40 of the first low-voltage output terminal 19. Also, an input of a fourth switch S14 of the first switching unit 48 is connected to a fourth position P4 along the first battery string 28 of series connected battery cells and an output of the fourth switch S14 of the first switching unit 48 is connected to a positive pole 41 of the first low-voltage output terminal 19. The third and fourth positions P3, P4 jointly define a third subset 44 of the series connected battery cells, such that the voltage level of the third subset 44 of the series connected battery cells is supplied at the first low-voltage output terminal 19 when the third and fourth switches S13, S14 of the first switching unit 48 are set in a conducting state.

In the example embodiment of FIG. 5, the second and third positions P2, P3 are the same position, or at least connected to the same conductor that is used for connecting two series connected battery cells of a string. However, the second and third positions P2, P3 may alternatively be connected to different battery cells.

Furthermore, an input of a first switch S21 of the second switching unit 49 is connected to a fifth position P5 along the first battery string 28 of series connected battery cells and an output of the first switch S21 of the second switching unit 49 is connected to a negative pole 42 of the second low-voltage output terminal 20. In addition, an input of a second switch S22 of the second switching unit 49 is connected to a sixth position P6 along the first battery string 28 of series connected battery cells and an output of the second switch S22 of the second switching unit 49 is connected to a positive pole 43 of the second low-voltage output terminal 20. The fifth and sixth positions P5, P6 jointly define the second subset 39 of the series connected battery cells, such that the voltage level of the second subset 39 of the series connected battery cells is supplied at the second low-voltage output terminal 20 when the first and second switches S21, S22 of the second switching unit 49 are set in a conducting state.

In the example embodiment of FIG. 5, the fourth and fifth positions P4, P5 are the same position, or at least connected to the same conductor that is used for connecting two series connected battery cells of a string. However, the fourth and fifth positions P4, P5 may alternatively be connected to different battery cells.

Moreover, an input of a third switch S23 of the second switching unit 49 is connected to a seventh position P7 along the first battery string 28 of series connected battery cells and an output of the third switch S23 of the second switching unit 49 is connected to the negative pole 42 of the second low-voltage output terminal 20.

An input of a fourth switch S24 of the second switching unit 49 is connected to an eighth position P8 along the first battery string 28 of series connected battery cells and an output of the fourth switch S24 of the second switching unit 49 is connected to a positive pole 43 of the second low-voltage output terminal 20.

The seventh and eighth positions P7, P8 may jointly define the fourth subset 45 of the series connected battery cells, such that the voltage level of the fourth subset 45 of the series connected battery cells is supplied at the second low-voltage output terminal 20 when the third and fourth switches S23, S24 of the second switching unit 49 are set in a conducting state.

In the example embodiment of FIG. 5, the sixth and seventh positions P6, P7 are the same position, or at least connected to the same conductor that is used for connecting two series connected battery cells of a string. However, sixth and seventh positions P6, P7 may alternatively be connected to different battery cells.

For each of the first and second switching units 48, 49, the third and fourth switches S13, S14, S23, S24 may be controlled to be set in non-conducting state when the first and second switches S11, S12, S21, S22 are set in the conducting state, and oppositely.

Consequently, the first switching unit 48 is connected to a first subset 38 of series connected battery cells, a third subset 44 of the series connected battery cells, and the first low-voltage output terminal 19. The first and third subsets 38, 44 are at least partly different from each other in terms of battery cells, and the first switching unit 48 is operable to selectively connect either the first subset 38 or the third subset 44 of the series connected battery cells to the first low-voltage output terminal 19 for supplying low-voltage electrical power from either the first subset 38 or third subset 44 to the first low-voltage electrical load S1, B1, 36.

Furthermore, the second switching unit 49 is connected to a second subset 39 of the series connected battery cells, a fourth subset 45 of the series connected battery cells, and the second low-voltage output terminal 20. The second and fourth subsets 39, 45 are at least partly different from each other in terms of battery cells, and the second switching unit 20 is operable to selectively connect either the second subset 39 or the fourth subset 45 of series connected battery cells to the second low-voltage output terminal 20 for supplying low-voltage electrical power from either the second subset 39 or fourth subset 45 to the second low-voltage electrical load S2, B2, 37.

In some example embodiments, as for example showed in the high-voltage battery pack of FIG. 5, none of the battery cells C1-C4 of the first subset 38 of series connected battery cells is included in the second subset 39 of series connected battery cells.

In some example embodiments, as for example showed in the high-voltage battery pack of FIG. 5, none of the battery cells C5-C8 of the third subset 44 of series connected battery cells is included in the fourth subset 45 of series connected battery cells.

In some example embodiments, as for example showed in the high-voltage battery pack of FIG. 5, none of the battery cells C1-C4 of the first subset 38 of series connected battery cells is included in the third subset 44 of series connected battery cells, and none of the battery cells C9-C12 of the second subset 39 of series connected battery cells is included in the fourth subset 45 of series connected battery cells.

In some example embodiments, as for example showed in the high-voltage battery pack of FIG. 5, each of the first and second switching units 48, 49 has an electronic switching unit controller 32, 33 operably connected to the switches of the first and second switching units 48, 49, respectively, and the high-voltage battery pack comprises an electronic battery pack controller 17 that is connected to the first and second switching unit controllers 32, 33 via a data communication channel and configured for submitting control instructions to the first and second switching unit controllers 32, 33.

FIG. 6 shows a further example embodiment of the high-voltage battery pack, wherein the high-voltage battery pack 5 includes six switches S11-S16, S21-S26 in each of the first and second switching units 48, 49, thereby enabling connection of three different subsets 38, 44, 46, 39, 45, 47 of series connected battery cells to each of the first and second low-voltage output terminals 48, 49.

FIG. 6 shows an example embodiment of the high-voltage battery 5 having four parallel connected battery strings 28-31, but the high-voltage battery 5 may include less or more battery strings connected in parallel with said first to fourth battery strings 28-31, and the first and second switching units 48, 49 may be connected to any number of said further battery strings for providing increased or reduced capacity (Ah) for supplying low-voltage power supply at the first and second low-voltage output terminals 19, 20.

The connections of the first to fourth switches S11-S14, S21-S24 of the first and second switching units 48, 49 are the same as described above with reference to FIG. 5, except that each of the first to fourth subsets 38, 39, 44, 45 includes battery cells from each of the first to fourth strings 28-31.

An input of a fifth switch S15 of the first switching unit 48 is connected to a ninth position P9 along the first battery string 28 and an output of the fifth switch S15 of the first switching unit 48 is connected to the negative pole 40 of the first low-voltage output terminal 19. Also, an input of a sixth switch S16 of the first switching unit 48 is connected to a tenth position P10 along the first battery string 28 of series connected battery cells and an output of the sixth switch S16 of the first switching unit 48 is connected to a positive pole 41 of the first low-voltage output terminal 19. The ninth and tenth positions P9, P10 jointly define a fifth subset 46 of the series connected battery cells, such that the voltage level of the fifth subset 46 of the series connected battery cells is supplied at the first low-voltage output terminal 19 when the fifth and sixth switches S15, S16 of the first switching unit 48 are set in a conducting state.

In the example embodiment of FIG. 6, the fourth and ninth positions P4, P9 are the same position, or at least connected to the same conductor that is used for connecting two series connected battery cells of a string. However, the fourth and ninth positions P4, P9 may alternatively be connected to different battery cells.

Similarly, in the example embodiment of FIG. 6, the fifth and tenth positions P5, P10 are the same position, or at least connected to the same conductor that is used for connecting two series connected battery cells of a string. However, the fifth and tenth positions P5, P10 may alternatively be connected to different battery cells.

Similarly, in the example embodiment of FIG. 6, the eighth and eleventh positions P8, P11 are the same position, or at least connected to the same conductor that is used for connecting two series connected battery cells of a string. However, the eighth and eleventh positions P8, P11 may alternatively be connected to different battery cells.

Furthermore, an input of a fifth switch S25 of the second switching unit 49 is connected to an eleventh position P11 along the first battery string 28 and an output of the fifth switch S25 of the second switching unit 49 is connected to the negative pole 42 of the second low-voltage output terminal 20. Also, an input of a sixth switch S26 of the second switching unit 49 is connected to a twelfth position P12 along the first battery string 28 of series connected battery cells and an output of the sixth switch S26 of the second switching unit 49 is connected to a positive pole 43 of the second low-voltage output terminal 20. The eleventh and twelfth positions P11, P12 jointly define a sixth subset 47 of the series connected battery cells, such that the voltage level of the sixth subset 47 of the series connected battery cells is supplied at the second low-voltage output terminal 20 when the fifth and sixth switches S25, S26 of the second switching unit 49 are set in a conducting state.

Consequently, the first switching unit 48 is further connected to a fifth subset 46 of the series connected battery cells and operable to selectively connect either the first, third or fifth subsets 38, 44, 46 of the series connected battery cells to the first low-voltage output terminal 19 for supplying low-voltage electrical power from either the first, third or fifth subsets 38, 44, 46 to the first low-voltage electrical load B1, S1, 36. In addition, the second switching unit 49 is further connected to a sixth subset 47 of the series connected battery cells and operable to selectively connect either the second, fourth or sixth subsets 39, 45, 47 of series connected battery cells to the second low-voltage output terminal 20 for supplying low-voltage electrical power from either the second, fourth or sixth subsets 39, 45, 49 to the second low-voltage electrical load B2, S2, 37.

The various subsets 38, 39, 44-47 of series connected battery cells may include battery cells from only a single string of battery cells, or from two, three, four or more strings of battery cells. In the example embodiment of FIG. 6, each of the first to sixth switching units S11-S16, S21-S26 of the first and second switching units 48, 49 are connected to each of the showed first to fourth strings 28-31 of battery cells.

Figure 7:
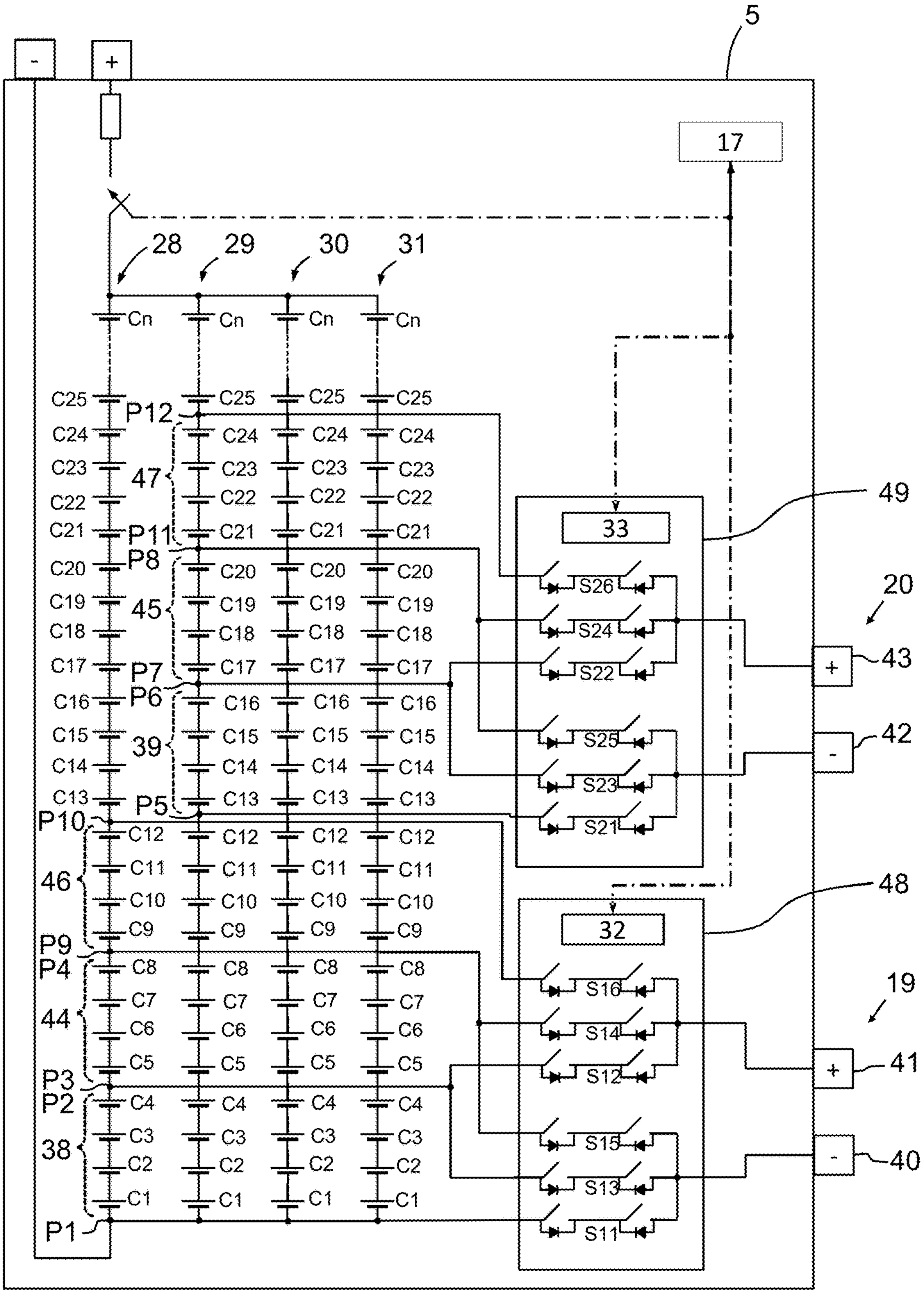
FIG. 7 shows schematically a further example embodiment of the high-voltage battery pack according to the disclosure.

FIG. 7 shows an alternative example embodiment of the high-voltage battery pack 5, in which the low-voltage electrical power supplied from first low-voltage output terminal 19 originates from the first string 28 of battery cells only, and in which the low-voltage electrical power supplied from second low-voltage output terminal 20 originates from the second string 29 of battery cells only. In other words, the first switching unit 48 is connected to a plurality of subsets of series connected battery cells belonging merely to the first string 28, and the second switching unit 49 is connected to a plurality of subsets of series connected battery cells belonging merely to the second string 29.

Specifically, the battery cells C1-C4 of the first subset 38, the battery cells C5-C8 of the third subset 44 and the battery cells C9-C12 of the fifth subset 46 only includes battery cells from the first string 28 of battery cells, and the battery cells C13-C16 of the second subset 39, the battery cells C17-C20 of the fourth subset 45, and the battery cells C21-C24 of the sixth subset 47 only includes battery cells from the second string of battery cells.

Thereby, failure of one of the first and second battery strings 28, 29 does not prevent continued power supply to at least one of the first and second low-voltage DC buses 22, 23.

Clearly, said subsets of series connected battery cells is not restricted to include battery cells from only a single string of battery cells, but may alternatively include battery cells from a plurality of strings of battery cells.

Figure 8:
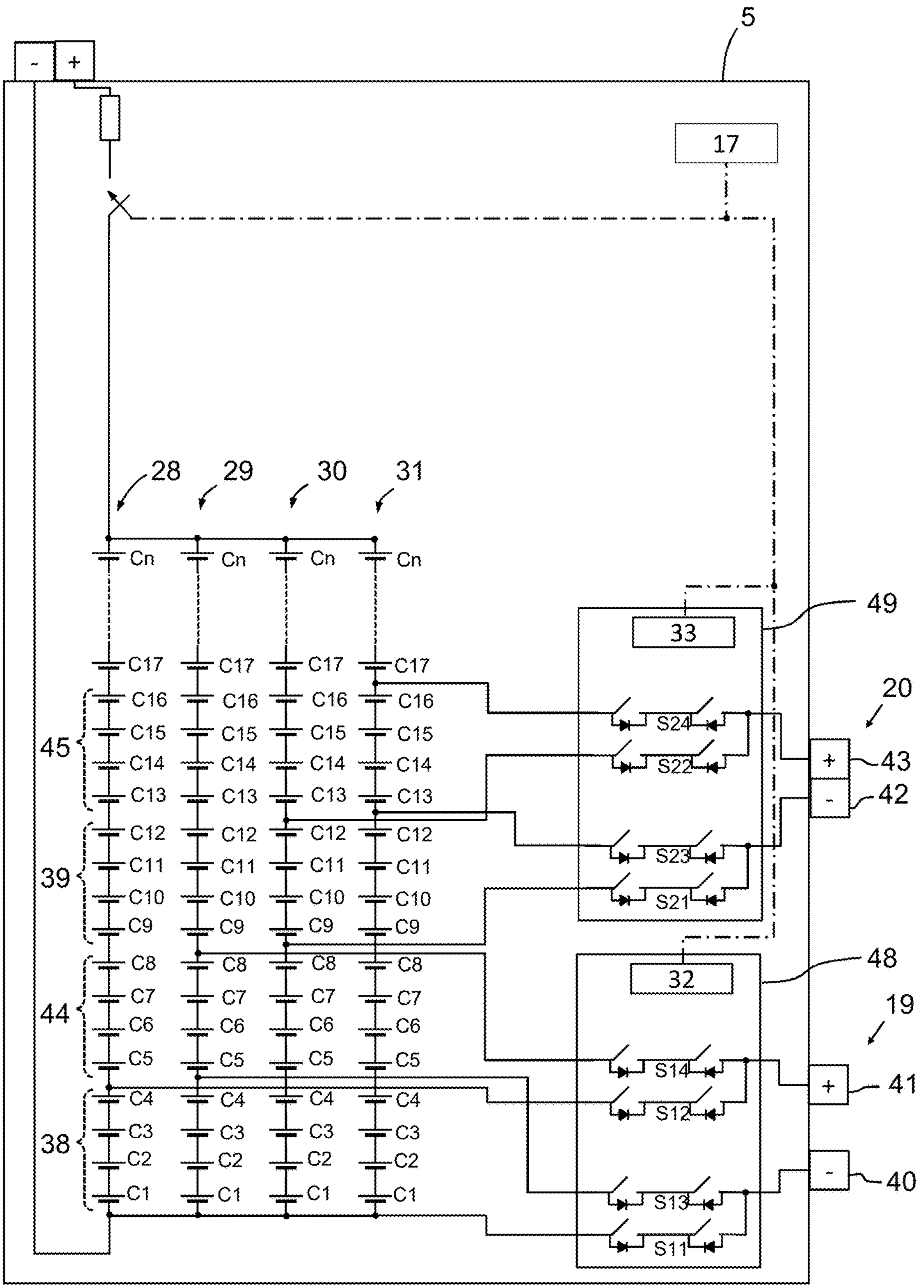
FIG. 8 shows schematically a further example embodiment of the high-voltage battery pack according to the disclosure.

For example, in the example embodiment of FIG. 8, the first switching unit 48 include first and second switches S11, S12 that jointly connect a first subset 38 of series connected battery cells C1-C4 of the first string 28 of battery cells to the first low-voltage output terminal 19. Similarly, the second switching unit 49 include first and second switches S21, S22 that jointly connect a second subset 39 of series connected battery cells C9-C12 of a third string 30 of battery cells to the second low-voltage output terminal 20.

Furthermore, the first switching unit 48 include third and fourth switches S13, S14 that jointly connect a third subset 44 of series connected battery cells C5-C8 of the second string 29 of battery cells to the first low-voltage output terminal 19. Similarly, the second switching unit 49 include third and fourth switches S23, S24 that jointly connect a fourth subset 45 of series connected battery cells C13-C16 of a fourth string 31 of battery cells to the second low-voltage output terminal 20.

Consequently, the first switching unit 48 is connected to a first subset 38 of series battery cells of the first string 28, a third subset 44 of series connected battery cells of the third string 30, and the first low-voltage output terminal 19. The battery cells of first and third subsets 38, 44 are thus not belonging to the same string, and the first switching unit 48 is operable to selectively connect either the first subset 38 or the third subset 44 of the series connected battery cells to the first low-voltage output terminal 19.

Furthermore, the second switching unit 49 is connected to a second subset 39 of series connected battery cells of the second string 29, a fourth subset 45 of series connected battery cells of the fourth string 31, and the second low-voltage output terminal 20. The second and fourth subsets 39, 45 are thus not belonging to the same string, and the second switching unit 20 is operable to selectively connect either the second subset 39 or the fourth subset 45 of series connected battery cells to the second low-voltage output terminal 20.

Thereby, both the first and second low-voltage output terminals are still being able to supply low-voltage power to the first and second low-voltage DC buses 22, 23 even if one of the first to fourth strings fails and/or becomes inoperable for some reason.

Figure 9:
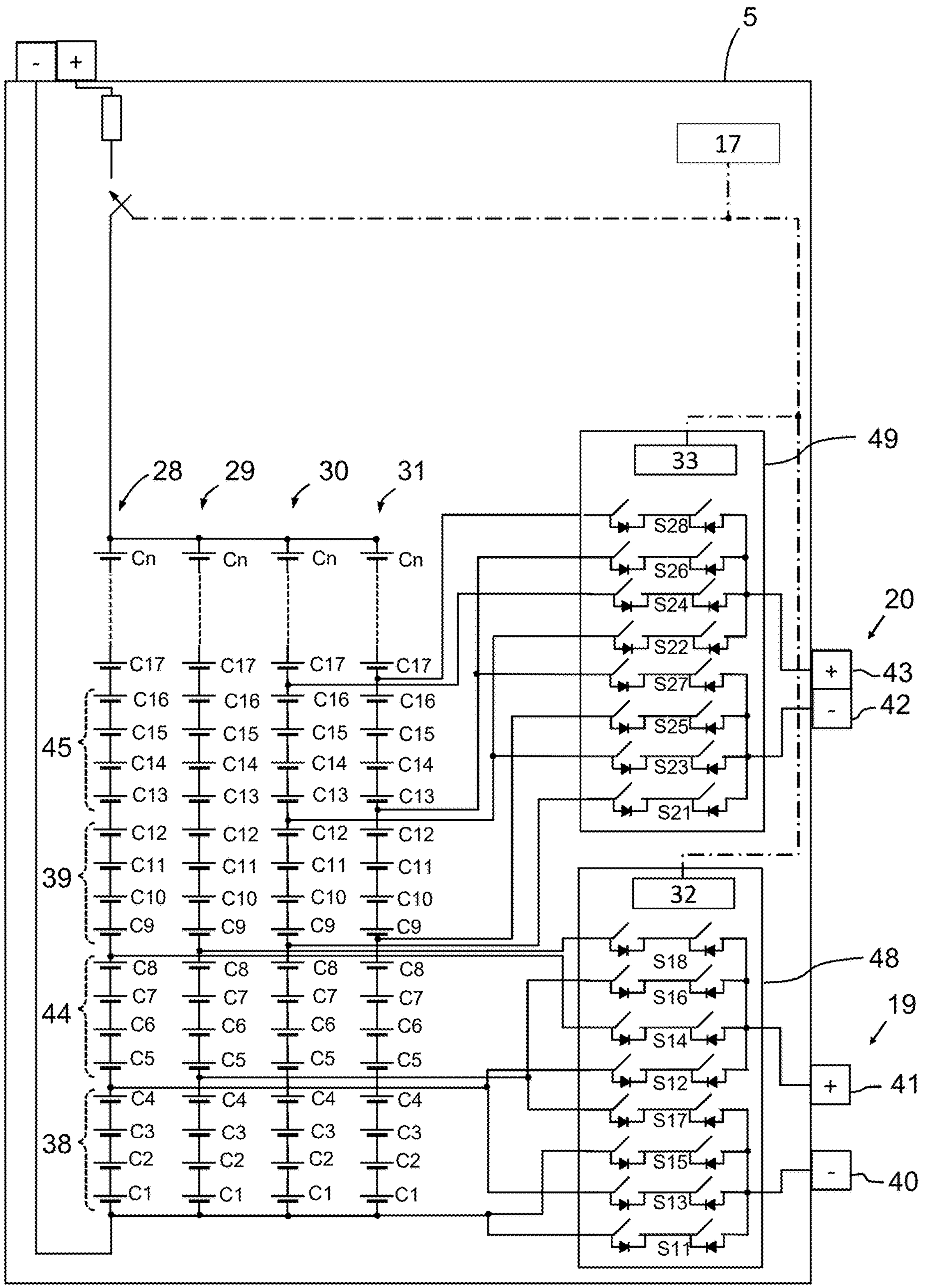
FIG. 9 shows schematically a further example embodiment of the high-voltage battery pack according to the disclosure.

FIG. 9 schematically shows a further example embodiment of the high-voltage battery pack 5 having first and second switching units 48, 49 that provides redundant low-voltage DC output. Specifically, the first switching unit 48 include first and second switches S11, S12 that jointly connect a first subset 38 of series connected battery cells C1-C4 of the first string 28 of battery cells to the first low-voltage output terminal 19. Similarly, the second switching unit 49 include first and second switches S21, S22 that jointly connect a second subset 39 of series connected battery cells C9-C12 of a third string 30 of battery cells to the second low-voltage output terminal 20.

Furthermore, the first switching unit 48 include third and fourth switches S13, S14 that jointly connect a third subset 44 of series connected battery cells C5-C8 of the first string 28 of battery cells to the first low-voltage output terminal 19. Similarly, the second switching unit 49 include third and fourth switches S23, S24 that jointly connect a fourth subset 45 of series connected battery cells C13-C16 of the third string 30 of battery cells to the second low-voltage output terminal 20.

In addition, the first switching unit 48 include fifth and sixth switches S15, S16 that jointly connect a first subset 38 of series connected battery cells C1-C4 of the second string 29 of battery cells to the first low-voltage output terminal 19. Similarly, the second switching unit 49 include fifth and sixth switches S25, S26 that jointly connect a second subset 39 of series connected battery cells C9-C12 of a fourth string 31 of battery cells to the second low-voltage output terminal 20.

Furthermore, the first switching unit 48 include seventh and eighth switches S17, S18 that jointly connect a third subset 44 of series connected battery cells C5-C8 of the second string 28 of battery cells to the first low-voltage output terminal 19. Similarly, the second switching unit 49 include seventh and eighth switches S23, S24 that jointly connect a fourth subset 45 of series connected battery cells C13-C16 of the fourth string 31 of battery cells to the second low-voltage output terminal 20.

Thereby, not only does the high-voltage battery pack 5 provides redundant low-voltage power supply protected against failure of a single string, but may each additionally swap between different subsets of battery cells within each of the disclosed first to fourth strings 28-31, thereby providing increased flexibility in terms of for example output voltage level, battery cell temperature, etc.

Consequently, according to some example embodiments, the low-voltage electrical power supplied from first low-voltage output terminal 19 may originate from a first set of strings including one or more strings, and the low-voltage electrical power supplied from second low-voltage output terminal 20 may originate from a second set of strings including one or more strings, wherein the strings of the first and second sets of strings are not the same.

In some example embodiments, none of the battery cells of the first subset of series connected battery cells is included in the second string of battery cells, and wherein none of the battery cells of the second subset of series connected battery cells are included in the first string of battery cells.

Figure 10:
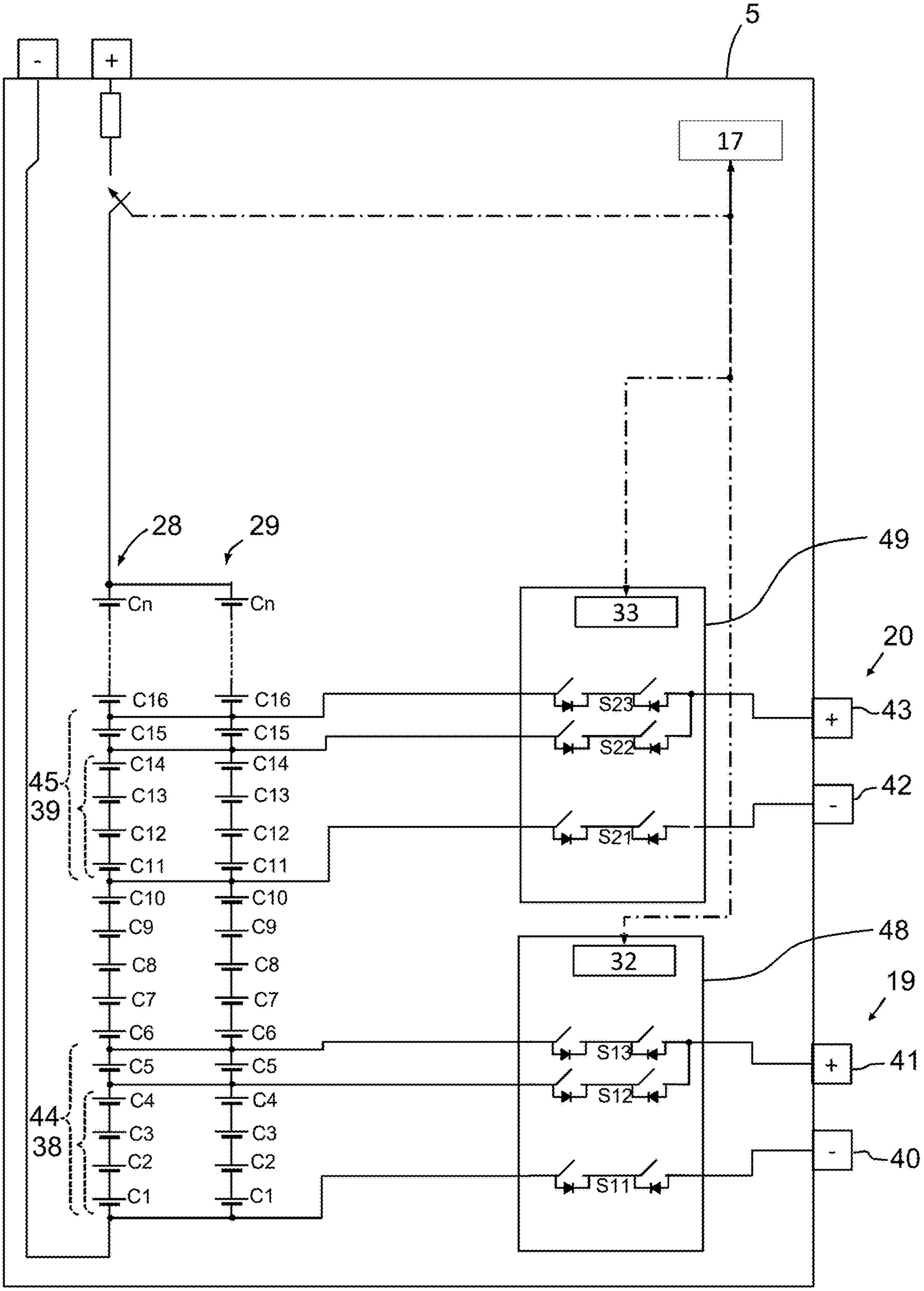
FIG. 10 shows schematically a further example embodiment of the high-voltage battery pack according to the disclosure.

FIG. 10 shows a further example embodiment of the high-voltage batter pack 5 that includes first and second strings 28, 29 of series connected battery cells, and wherein the first and second strings 28, 29 are connected in parallel with each other. However, the number of strings included in the high-voltage battery, and connected to the first and second switching units 48, 49 may be different.

The first switching unit 48 include first and second switches S11, S12 that jointly connect a first subset 38 of series connected battery cells C1-C4 to the first low-voltage output terminal 19. Similarly, the second switching unit 49 include first and second switches S21, S22 that jointly connect a second subset 39 of series connected battery cells C11-C14 to the second low-voltage output terminal 20.

Furthermore, the first switching unit 48 further includes a third switch S13, wherein an input of the second switch S13 is connected to the string of battery cells at a location that defines a third subset 44 of battery cells together with the first switch S11, wherein the third subset 44 includes the battery cells C1-C4 of the first subset 38 and one additional battery cell C5, thereby enabling increased voltage supply level at the first low-voltage output terminal 19, for example for compensating for low state of charge of the battery cells.

Similarly, the second switching unit 49 further includes a third switch S23, wherein an input of the second switch S23 is connected to the string of battery cells at a location that defines a fourth subset 45 of battery cells together with the first switch S21 of the second switching unit 49, wherein the fourth subset 45 includes the battery cells C11-C14 of the second subset 39 and one additional battery cell C15, thereby enabling increased voltage supply level at the second low-voltage output terminal 20, for example for compensating for low state of charge of the battery cells.

As a result, the first and third subsets 38, 44 include partly the same battery cells. Similarly, the second and fourth subsets 39, 45 include partly the same battery cells.

On the other hand, none of first and third subsets 38, 44 includes battery cells of any of the second and fourth subsets 39, 45.

Figure 11:
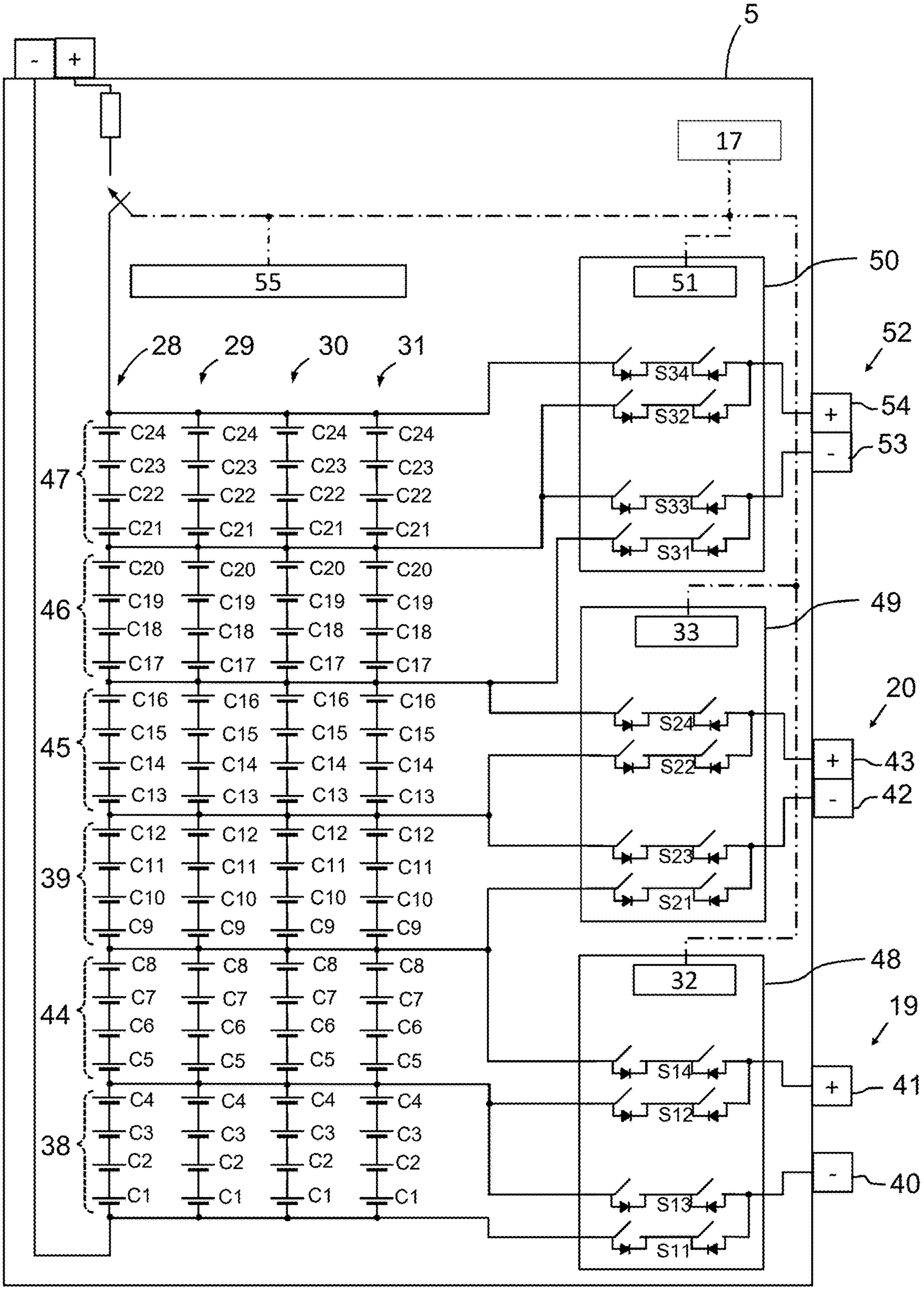
FIG. 11 shows schematically a further example embodiment of the high-voltage battery pack according to the disclosure.

FIG. 11 shows still a further example embodiment of the high-voltage battery pack 5 having three individual low-voltage output terminals 19, 20, 52 for providing further increased flexibility in terms of circuit layout of the electrical system of the vehicle.

Specifically, the high-voltage battery pack 5 comprises a first switching unit 48 configured to selectively connect either a first or a third subset 38, 44 of series connected battery cells C1-C4, C5-C8 to a first low-voltage output terminal 19. The high-voltage battery pack 5 further includes a second switching unit 49 configured to selectively connect either a second or a fourth subset 39, 45 of series connected battery cells C9-C12, C13-C16 to a second low-voltage output terminal 20. In addition, the high-voltage battery pack 5 further includes a third switching unit 50 configured to selectively connect either a fifth or a sixth subset 46, 47 of series connected battery cells C17-C20, C21-C24 to a third low-voltage output terminal 52.

More in detail, the third switching unit 50 has a plurality of electric switches and a third electronic switching unit controller 51 configured for controlling the switching operation of the switches of the third switching unit 50. The third switching unit 50 is connected to the fifth subset 46 of the series connected battery cells, a sixth subset 46 of the series connected battery cells, and the third low-voltage output terminal 52, wherein the third switching unit 50 is operable to selectively connect either the fifth or the sixth subsets 46, 47 of the series connected battery cells to the third low-voltage output terminal 52 for supplying low-voltage electrical power from either the fifth or sixth subsets 46, 47 to a third low-voltage electrical load.

An input of the first and second switches S31, S32 of the third switching unit 50 is connected to the fifth subset 46 of battery cells, and an output of the first switch S31 of the third switching unit 50 is connected to a negative pole 53 of the third low-voltage output terminal 52, and an output of the second switch S32 of the third switching unit 50 is connected to a positive pole 54 of the third low-voltage output terminal 52. In addition, an input of the third and fourth switches S33, S34 of the third switching unit 50 is connected to the sixth subset 47 of battery cells, and an output of the third switch S33 of the third switching unit 50 is connected to a negative pole 53 of the third low-voltage output terminal 52, and an output of the fourth switch S34 of the third switching unit 50 is connected to a positive pole 54 of the third low-voltage output terminal 52.

A high-voltage battery pack 5 having three individual low-voltage output terminals 19, 20, 52 provides further increased flexibility in terms of circuit layout of the electrical system of the vehicle. This may for example be useful for powering first and second redundant low-voltage voltage DC buses for powering safety-critical electrical loads using for example first and second low-voltage DC output terminals 19, 20, and powering convenient low-voltage DC loads using for example the third low-voltage DC output terminal 52. Alternatively, first and second low-voltage DC output terminals 19, 20 may be used for powering first and second redundant 12V DC buses for powering safety-critical electrical loads, while the third low-voltage DC output terminal 52 powers medium-voltage DC loads with a higher voltage level, such as 24V, 36V or 48V, or the like. Higher voltage level at the third low-voltage DC output terminal 52 is for example obtained by including longer strings of series connected battery cells into for example the fifth and sixth subsets.

Each of the first to fourth strings 28-31 may of course include more than 24 series battery cells, and the number of parallel-connected strings within the high-voltage battery pack 5 may of course be significantly larger, and the first to third switching units 48-50 may be connected to one or more of said strings.

The high-voltage battery unit 5 may optionally also include a cell balancing circuit 55 that is connected to the individual battery cells of the high-voltage battery pack 5 for balancing the state of charge of the plurality of battery cells of the battery 5. A balancing circuit may also be included in each of the other example embodiments described within the present disclosure.

Common to all example embodiments of the high-voltage battery pack 5 described herein is that the switches of each switching unit 48, 49, 50 that may be controlled by an electronic switching unit controller 32, 33, 51 associated with each switching unit 48, 49, 50, respectively.

The electronic switching unit controller 32, 33, 51 enables development of smarter and more advanced electronic switching unit controller 32, 33, 51. Moreover, the electronic switching unit controller 32, 33, 51 of each switching unit 48, 49, 50 may be connected for enabling data communicating with a common battery pack controller 17 of the high-voltage battery pack 5.

The common battery pack controller 17 may for example control and monitor the energy management for whole high-voltage battery pack 5. Specifically, the common battery pack controller 17 may be arranged to control the various individual switching units 48, 49, 50 as a function of various parameters, such as requested or predetermined supply voltage level, and the electronic switching unit controller 32, 33, 51 of each switching unit 48, 49, 50 may then be arranged to control operations of the switches S11-S14, S21-S24, S31-S34 of one or more switching units 48, 49, 50 for providing desired low-voltage power from high-voltage battery pack 5 to fulfill the system need, while taking into account aspects such as individual battery cell voltage level, temperature level, state of health, etc.

This will also enable a more optimized usage of individual battery cells, battery strings, and even battery modules of the high-voltage battery pack 5. For example, the battery pack controller 17 may swap between different battery strings or battery modules within the high-voltage battery pack 5 in case of low capacity in one of the strings or modules.

Each switching units 48, 49, 50 can for example be arranged to handle one individual low-voltage DC-bus, also referred to as a power supply line. The high-voltage battery pack 5, in particular the switching units 48, 49, 50, corresponds to the main power supply source to the electrical loads of each of said individual low-voltage DC-buses 22, 23. In case one or more of individual low-voltage DC-buses 22, 23 include a separate low-voltage battery pack, such as a regular 12V battery 6, 7, as described in FIG. 2, these 12V batteries 6, 7 will receive charging power from the any of the first to third low-voltage output terminals 19, 20, 52.

The high-voltage battery pack 5 is arranged for monitoring status and operation of individual battery cells and/or strings of battery cells, and the switching units 48, 49, 50 are arranged to detect faults that may occur and to control the switches S11-S34 to secure the energy availability to the electrical loads, for example by setting individual switches, or a whole switching unit 48, 49, 50, in open state.

The switching units 48, 49, 50 may also be arranged to monitor the electrical loads connected to the low-voltages DC buses 22, 23 for detecting faults that may occur in this loads, or somewhere else along the low-voltage DC-bus, such as a short-circuit or overvoltage. The switching units 48, 49, 50 may be arranged for detecting and handling such faults in a high level of safety integrity, and without exceeding fault tolerant time interval, for securing the energy availability to the electrical loads.

The electronic battery pack controller 17 and switching units 48, 49, 50 shall secure robust voltage level and provide electrical power to both the high-voltage system and low-voltage system. This includes monitoring and distribution of energy for securing energy availability for accomplishing long driving range to a vehicle propulsion system and high power supply reliability to the low-voltage electrical loads.

The layout of the high-voltage battery pack 5 may be adapted to each individual implementation and purpose. For example, a total voltage level of the at least one string of battery cells may be in the range of 48-2000 Volt, specifically in the range of 200-1500 Volt.

The at least one string of series connected battery cells may include about 20-1000 series connected battery cells, specifically 75-750 series connected battery cells, depending on the desired output voltage level and battery cell voltage level.

The voltage level of each of the first and second subsets of the series connected batteries may be in the range of 10-50 Volt, specifically in the range of 12-48 Volt.

The cell voltage level of the plurality of battery cells may for example be in the range of 1-5 Volt, specifically in the range of 2.5-4.5 Volt.

Each of the first and second subsets 38, 39 of the series connected battery cells may for example include 3-13 battery cells, specifically 3-5 battery cells.

Each of the switching units 48, 49, 50 may for example include multiple pairs of power transistors, wherein the power transistors of each pair are connected in series back-to-back. In other words, each of the individual switches S11-S18, S21-S28, S31-S34 of one or more switching units 48, 49, 50 may be implemented by means of a pair of series-connected power transistors that are connected facing opposite directions. Thereby, current flowing through each of the individual switches S11-S18, S21-S28, S31-S34 can be controlled in both directions. The power transistors may be Bipolar Junction Transistors, MOSFET's, or Insulated-Gate Bipolar Transistor, or the like.

The first and second switching units have identical electrical design and functionality for enabling reduced manufacturing cost and increased flexibility.

As schematically illustrated in FIG. 2, the high-voltage battery pack is free from a DC/DC converter. A DC/DC converter means an electric unit that transforms a DC input having a first voltage level to a DC output having a second voltage level that is increased or reduced relative to the first voltage level, such as for example buck or boost switching device.

The first and second switching units may preferably be integrated in the high-voltage battery pack 5 for protection and a more compact design.

The high-voltage battery pack 5 may include an internal cooling arrangement, in particular a liquid cooling circuit, for cooling of the battery cells, and the voltage battery pack 5 may be arranged for routing the cooling liquid also to the first and second switching units 19, 20 for cooling thereof, thereby providing a more low-cost and compact design.

The high-voltage battery pack 5 may depending on for example desired capacity include a large number of parallel-connected strings of battery cells. In such cases, it may be useful implement the strings into a number of separate battery modules and connect said battery modules in parallel with each other.

Figure 12:
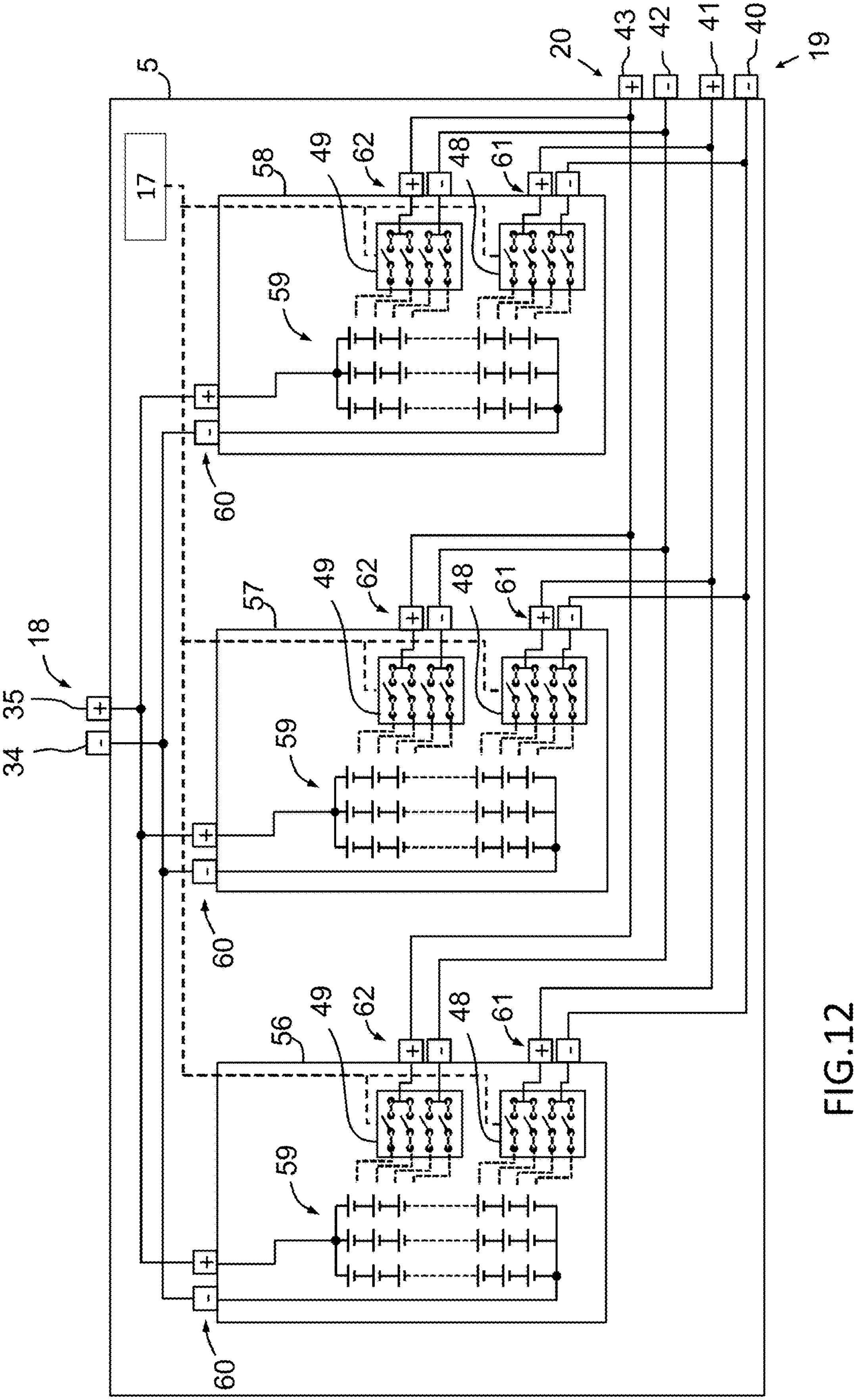
FIG. 12 shows schematically a high-voltage battery pack having a plurality of high-voltage battery modules.

FIG. 12 schematically shows a high-voltage battery pack 5 including first, second and third battery modules 56, 57, 58, each including a set 59 of strings of battery cells connected to a high-voltage output connection 60. The high-voltage output connection 60 of the modules 56-58 are subsequently connected in parallel and to the high-voltage output terminal 18 of the high-voltage battery pack 5.

In this example embodiment, each of the first to third battery modules additionally includes first and second switching units 48, 49 connected to first and second low-voltage output connections 61, 62. The first low-voltage output connection 61 are subsequently connected in parallel and to the first low-voltage output terminal 19 of the high-voltage battery pack 5, and the second low-voltage output connection 62 are subsequently connected in parallel and to the second low-voltage output terminal 20 of the high-voltage battery pack 5.

A battery module may for example be an individual package or housing including a set of strings of battery cells. The battery modules enable a modular design of the high-voltage battery pack 5, and simplified repair and service.

Figure 13:
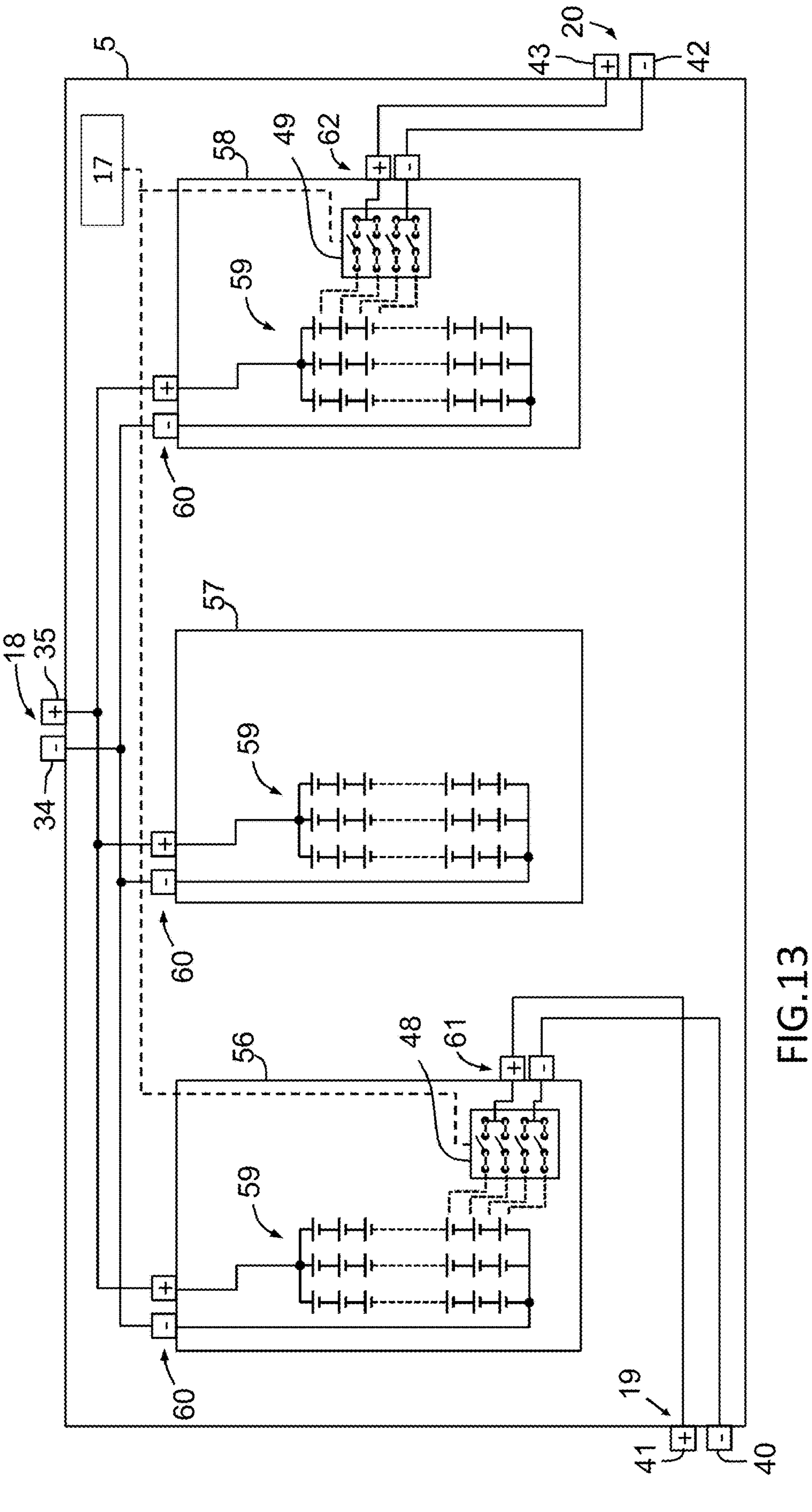
FIG. 13 shows schematically a further example embodiment of the high-voltage battery pack having a plurality of high-voltage battery modules.

FIG. 13 schematically shows a further example embodiment of the high-voltage battery pack 5 including first, second and third battery modules 56, 57, 58, each including a set 59 of strings of battery cells connected to a high-voltage output connection 60. The high-voltage output connection 60 of the modules 56-58 are subsequently connected in parallel and to the high-voltage output terminal 18 of the high-voltage battery pack 5.

In this example embodiment, the first battery module 56 additionally includes a first switching unit 48 connected to a first low-voltage output connection 61, which is subsequently connected to the first low-voltage output terminal 19 of the high-voltage battery pack 5. The second battery pack 57 does not include any additional switching units or low-voltage output terminals. The third battery module 58 however additionally includes a second switching unit 49 connected to a second low-voltage output connection 62, which is subsequently connected to the second low-voltage output terminal 20 of the high-voltage battery pack 5

Thereby, the first and second low-voltage output terminals 19, 20 may be located at a position close the their respective electrical loads, and the battery module(s) located close to first and second low-voltage output terminals 19, 20 may be used for powering said loads, thereby reducing the total amount of wiring harness and complexity of the high-voltage battery pack 5 and vehicle electrical system.

Consequently, the high-voltage battery pack 5 may comprise a plurality of individual high-voltage battery modules 56, 57, 58, each including at least one string of series connected battery cells and a high-voltage output connection connected to the at least one string. The high-voltage output connections of the plurality of high-voltage battery modules are connected in parallel and coupled to the high-voltage output terminal of the high-voltage battery pack. At least one of said plurality of high-voltage battery modules comprises: a first low-voltage output connection connected to the first low-voltage output terminal of high-voltage battery pack, and said first subset of the series connected battery cells connected to the first low-voltage output connection. At least one of said plurality of high-voltage battery modules comprises: a second low-voltage output connection connected to the second low-voltage output terminal of high-voltage battery pack, and said second subset of the series connected battery cells connected to the second low-voltage output connection.

Clearly, the high-voltage battery pack 5 is not restricted any of the above-described embodiments, but may include any number of battery modules, which may have different layouts in terms of energy capacity and low-voltage output connections.

In general, the high-voltage battery pack 5 according to the disclosure eliminates the need for separate DC/DC converters connecting the high-voltage DC bus with the first and second low-voltage DC buses of the vehicle electrical system. As a result of this system solution, the cable harness between distributed electrical boxes/loads may be reduced, the EMI issues may be improved, the voltage quality in all cases at the electrical system may be improved, the battery capacity/energy availability is bigger/better, is it possible to provide power to high transient current spikes, lower weight and reduced manufacturing cost.

Moreover, the high-voltage battery pack 5 according to the disclosure enables a selectivity of battery cells to be connected to the first and second low-voltage output terminals 19, 20, for enabling supply different low voltage systems depending on their needs.

In addition, the high-voltage battery pack 5 is often relatively flat and large and it may cover the whole vehicle platform. Consequently, by placing the low-voltage output terminals 19, 20 and the associated switching units at locations on the high-voltage battery pack 5 that are close to their respective low-voltage electrical loads and/or distribution boxes of the electrical vehicle, the cost for wiring harness may be reduced by reduced and assembly of the vehicle may be simplified.

Figure 14:
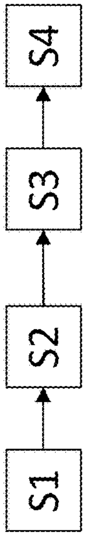
FIG. 14 shows schematically the basic steps of a method according to the disclosure.

FIG. 14 shows the basic steps of a method for supplying high-voltage electrical power and low-voltage electrical power to electrical loads of an electrical system of an electric vehicle 1. The method comprises a first step S10 of providing a high-voltage battery pack 5. The high-voltage battery pack 5 has a high-voltage output terminal 18, a first low-voltage output terminal 19, a second low-voltage output terminal 20, and a plurality of battery cells 27 connected to form at least one string 28-31 of series connected battery cells, wherein the battery cells of the at least one string 28-31, in particular two end cells of the at least one string, are connected to the high-voltage output terminal 18. The method further comprises a second step S20 of connecting the high-voltage output terminal 18 to a high-voltage electrical load 4 of the electrical system via a high-voltage DC bus 24 of the electric vehicle 1, for supplying high-voltage electrical power to the high-voltage electrical load 4. The method additionally comprises a third step S30 of connecting the first low-voltage output terminal 19 to a first low-voltage electrical load B1, S1, 36 of the electrical system via a first low-voltage DC bus 22 of the electrical system 14, wherein a first subset 38 of the series connected battery cells is configured for supplying low-voltage electrical power to the first low-voltage electrical load B1, S1, 36 via the first low-voltage DC bus 22. Furthermore, the method comprises a fourth step S40 of connecting the second low-voltage output terminal 20 to a second low-voltage electrical load S2, B2, 37 of the electrical system 14 via a second low-voltage DC bus 23 of the electrical system 14, wherein a second subset 39 of the series connected battery cells is configured for supplying low-voltage electrical power to the second low-voltage electrical load S2, B2, 37 via the second low-voltage DC bus 23.

In some example embodiments, the high-voltage battery pack comprises a first switching unit 48 having a plurality of electric switches S11-S18 and a second switching unit 49 with a plurality of electric switches S21-S28. The first switching unit 48 may be connected to: the first subset 38 of the series connected battery cells, a third subset 44 of the series connected battery cells, and the first low-voltage output terminal 19. The second switching unit 49 may be connected to: the second subset 39 of the series connected battery cells, a fourth subset 45 of the series connected battery cells, and the second low-voltage output terminal 20. The method may further comprise a fifth step of controlling the first switching unit 48 to selectively connect either the first or the third subsets 38, 44 of the series connected battery cells to the first low-voltage output terminal 19, and controlling the second switching unit 49 to selectively connect either the second or the fourth subsets 39, 45 of series connected battery cells to the second low-voltage output terminal 20.

The present disclosure has been presented above with reference to specific embodiments. However, other embodiments than the above described are possible and within the scope of the disclosure.

Those skilled in the art will appreciate that the control steps explained herein, such as controlling the first switching unit to selectively connect either the first or the third subset of the series connected battery cells to the first low-voltage output terminal, and controlling the second switching unit to selectively connect either the second or the fourth subset of series connected battery cells to the second low-voltage output terminal, may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the method steps disclosed herein when executed by the one or more processors.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope will include any embodiments falling within the foregoing description and the appended claims. Reference signs mentioned in the claims should not be seen as limiting the extent of the matter protected by the claims, and their sole function is to make claims easier to understand.

REFERENCE SIGNS

1. Vehicle
2. Vehicle body
3. Wheels
4. Electric propulsion motor
5. High-voltage battery pack
6. First low-voltage battery pack
7. Second low-voltage battery pack
8. Motor controller
9. First DC/DC converter
10. Second DC/DC converter
11. On-board charging inlet
12. On-board charger
13. Fuse
14. On-board electrical system
15. High-voltage battery system
16. High-voltage switch
17. Battery pack controller
18. High-voltage output terminal
19. First low-voltage output terminal
20. Second low-voltage output terminal
21. String of battery cells
22. First low-voltage DC bus
23. Second low-voltage DC bus
24. High-voltage DC bus
25. First data communication line
26. Second data communication line
27. Battery cells
28. $1^{st}$ battery string
29. $2^{nd}$ battery string
30. $3^{rd}$ battery string
31. $4^{th}$ battery string
32. First electronic switching unit controller
33. Second electronic switching unit controller
34. Negative pole of the high-voltage output terminal
35. Positive pole of the high-voltage output terminal
36. First low-voltage electrical load
37. Second low-voltage electrical load
38. First subset of battery cells
39. Second subset of battery cells
40. Negative pole of first low-voltage output terminal
41. Positive pole of first low-voltage output terminal
42. Negative pole of second low-voltage output terminal
43. Positive pole of second low-voltage output terminal
44. Third subset of battery cells
45. Fourth subset of battery cell
46. Fifth subset of battery cell
47. Sixth subset of battery cells
48. First switch unit
49. Second switch unit
50. Third switch unit
51. Third electronic switching unit controller
52. Third low-voltage output terminal
53. Negative pole of third low-voltage output terminal
54. Positive pole of third low-voltage output terminal
55. Cell balancing circuit
56. First battery module
57. Second battery module
58. Third battery module
59. Set of strings
60. High-voltage output connection
61. First low-voltage output connection
62. Second low-voltage output connection
ECU1—First master electronic control unit
ECU2—Second master electronic control unit
S1—First steering modules
S2—Second steering module
B1—First braking module
B2—Second braking module
L1—First electrical load
L2—Second electrical load
C1—First battery end cell
Cn—Second battery end cell
S11, S21, S31—First switch
S12, S22, S32—Second switch
S13, S23, S33—Third switch
S14, S24, S34—Fourth switch
S15, S25—Fifth switch
S16, S26—Sixth switch
S17—Seventh switch
S18—Eighth switch
P1—First position
P2—Second position
P3—Third position
P4—Fourth position
P5—Fifth position
P6—Sixth position
P7—Seventh position P8—Eighth position
P9—Ninth position
P10—Tenth position
P11—Eleventh position
P12—Twelfth position

What is claimed is:

1. A high-voltage battery pack for an electrical system, the high-voltage battery pack comprising:

a high-voltage output terminal configured for being connected to a high-voltage electrical load of the electrical system;

a plurality of battery cells connected to form at least one string of series connected battery cells, wherein the battery cells of the at least one string are connected to the high-voltage output terminal for supplying high-voltage electrical power to the high-voltage electrical load;

a first low-voltage output terminal configured for being connected to a first low-voltage electrical load of the electrical system, wherein a first subset of the series connected battery cells is configured for supplying low-voltage electrical power to the first low-voltage electrical load; and a second low-voltage output terminal configured for being connected to a second low-voltage electrical load of the electrical system, wherein a second subset of the series connected battery cells is configured for supplying low-voltage electrical power to the second low-voltage electrical load;

a first switching unit having a plurality of electric switches and a second switching unit with a plurality of electric switches, wherein the first switching unit is connected to:

the first subset of the series connected battery cells,
a third subset of the series connected battery cells, and
the first low-voltage output terminal, wherein the first switching unit is operable to selectively connect either the first or the third subsets of the series connected battery cells to the first low-voltage output terminal, wherein the second switching unit is connected to:

the second subset of the series connected battery cells,
a fourth subset of the series connected battery cells, and
the second low-voltage output terminal, wherein the second switching unit is operable to selectively connect either the second or the fourth subsets of series connected battery cells to the second low-voltage output terminal.

2. The high-voltage battery pack according to claim 1, wherein the battery cells of the first subset of series connected battery cells are included in a first string of battery cells, and wherein the battery cells of the second subset of series connected battery cells are included in a second string of battery cells.

3. The high-voltage battery pack according to claim 1, wherein none of the battery cells of the first subset of series connected battery cells is included in the second string of battery cells, and wherein none of the battery cells of the second subset of series connected battery cells are included in the first string of battery cells.

4. The high-voltage battery pack according to claim 1, wherein the battery cells of both the first and second subsets of series connected battery cells is included in both the first and second strings of battery cells.

5. The high-voltage battery pack according to claim 1, wherein each of the first and second subsets of the series connected battery cells include 3-13 battery cells, specifically 3-5 battery cells, per string.

6. The high-voltage battery pack according to claim 1, wherein the first switching unit further is connected to a fifth subset of the series connected battery cells, wherein the first switching unit is operable to selectively connect either the first, third or fifth subset of the series connected battery cells to the first low-voltage output terminal, wherein the second switching unit further is connected to a sixth subset of the series connected battery cells, wherein the second switching unit is operable to selectively connect either the second, fourth or sixth subset of series connected battery cells to the second low-voltage output terminal.

7. The high-voltage battery pack according to claim 1, wherein the first and second switching units have identical interior electrical design and functionality.

8. The high-voltage battery pack according to claim 1, wherein each of the first and second switching units has an electronic switching unit controller operably connected to the switches of the first and second switching units, respectively, and wherein the high-voltage battery pack comprises an electronic battery pack controller that is connected to the first and second switching units via a data communication channel and configured for submitting control instructions to the first and second switching units.

9. The high-voltage battery pack according to claim 1, further comprising a third switching unit having a plurality of electric switches, and a third low-voltage output terminal, wherein the third switching unit is connected to:

the fifth subset of the series connected battery cells,
a sixth subset of the series connected battery cells, and
the third low-voltage output terminal, wherein the third switching unit is operable to selectively connect either the fifth or the sixth subsets of the series connected battery cells to the third low-voltage output terminal.

10. The high-voltage battery pack according to claim 1, wherein an internal liquid cooling circuit of the high-voltage battery pack is configured for cooling also the first and second switching units.

11. The high-voltage battery pack according to claim 1, wherein the high-voltage battery pack comprises a plurality of individual high-voltage battery modules, each including at least one of said strings of series connected battery cells and a high-voltage output connection connected to the at least one string, wherein the high-voltage output connections of the plurality of high-voltage battery modules are connected in parallel and coupled to the high-voltage output terminal of the high-voltage battery pack, wherein at least one of said plurality of high-voltage battery modules comprises:

a first low-voltage output connection connected to the first low-voltage output terminal of the high-voltage battery pack, and said first subset of the series connected battery cells connected to the first low-voltage output connection, wherein at least one of said plurality of high-voltage battery modules comprises:

a second low-voltage output connection connected to the second low-voltage output terminal of high-voltage battery pack, and said second subset of the series connected battery cells connected to the second low-voltage output connection.

12. An on-board electrical system for an electric vehicle comprising:

a high-voltage battery pack according to claim 1, wherein the high-voltage output terminal of the high-voltage battery pack is connected to a high-voltage electrical load of the electrical system via a high-voltage DC bus of the electric vehicle;

wherein the first low-voltage output terminal of the high-voltage battery pack is connected to a first low-voltage electrical load of the electrical system via a first low-voltage DC bus of the electrical system; and wherein the second low-voltage output terminal of the high-voltage battery pack is connected to a second low-voltage electrical load of the electrical system via a second low-voltage DC bus of the electrical system.

13. A method for supplying high-voltage electrical power and low-voltage electrical power to electrical loads of an electrical system, comprising:

providing a high-voltage battery pack having: a high-voltage output terminal, a first low-voltage output terminal, a second low-voltage output terminal, a plurality of battery cells connected to form at least one string of series connected battery cells, wherein the battery cells of the at least one string are connected to the high-voltage output terminal;

connecting the high-voltage output terminal to a high-voltage electrical load of the electrical system via a high-voltage DC bus of the electric vehicle, for supplying high-voltage electrical power to the high-voltage electrical load;

connecting the first low-voltage output terminal to a first low-voltage electrical load of the electrical system via a first low-voltage DC bus of the electrical system, wherein a first subset of the series connected battery cells is configured for supplying low-voltage electrical power to the first low-voltage electrical load via the first low-voltage DC bus of the electrical system; and connecting the second low-voltage output terminal to a second low-voltage electrical load of the electrical system via a second low-voltage DC bus of the electrical system, wherein a second subset of the series connected battery cells is configured for supplying low-voltage electrical power to the second low-voltage electrical load via the second low-voltage DC bus of the electrical system;

wherein the high-voltage battery pack comprises a first switching unit having a plurality of electric switches and a second switching unit with a plurality of electric switches, wherein the first switching unit is connected to the first subset of the series connected battery cells, a third subset of the series connected battery cells, and the first low-voltage output terminal, wherein the second switching unit is connected to the second subset of the series connected battery cells, a fourth subset of the series connected battery cells, and the second low-voltage output terminal, wherein the method comprising:

controlling the first switching unit to selectively connect either the first or the third subsets of the series connected battery cells to the first low-voltage output terminal; and controlling the second switching unit to selectively connect either the second or the fourth subsets of series connected battery cells to the second low-voltage output terminal.

14. A high-voltage battery pack for an electrical system, the high-voltage battery pack comprising:

a high-voltage output terminal configured for being connected to a high-voltage electrical load of the electrical system;

a plurality of battery cells connected to form at least one string of series connected battery cells, wherein the battery cells of the at least one string are connected to the high-voltage output terminal for supplying high-voltage electrical power to the high-voltage electrical load;

a first low-voltage output terminal configured for being connected to a first low-voltage electrical load of the electrical system, wherein a first subset of the series connected battery cells is configured for supplying low-voltage electrical power to the first low-voltage electrical load; and a second low-voltage output terminal configured for being connected to a second low-voltage electrical load of the electrical system, wherein a second subset of the series connected battery cells is configured for supplying low-voltage electrical power to the second low-voltage electrical load;

wherein none of the battery cells of the first subset of series connected battery cells is included in the second string of battery cells, and wherein none of the battery cells of the second subset of series connected battery cells are included in the first string of battery cells.

15. A high-voltage battery pack for an electrical system, the high-voltage battery pack comprising:

a high-voltage output terminal configured for being connected to a high-voltage electrical load of the electrical system;

a plurality of battery cells connected to form at least one string of series connected battery cells, wherein the battery cells of the at least one string are connected to the high-voltage output terminal for supplying high-voltage electrical power to the high-voltage electrical load;

a first low-voltage output terminal configured for being connected to a first low-voltage electrical load of the electrical system, wherein a first subset of the series connected battery cells is configured for supplying low-voltage electrical power to the first low-voltage electrical load; and a second low-voltage output terminal configured for being connected to a second low-voltage electrical load of the electrical system, wherein a second subset of the series connected battery cells is configured for supplying low-voltage electrical power to the second low-voltage electrical load;

wherein the battery cells of both the first and second subsets of series connected battery cells is included in both the first and second strings of battery cells.

16. A high-voltage battery pack for an electrical system, the high-voltage battery pack comprising:

a high-voltage output terminal configured for being connected to a high-voltage electrical load of the electrical system;

a plurality of battery cells connected to form at least one string of series connected battery cells, wherein the battery cells of the at least one string are connected to the high-voltage output terminal for supplying high-voltage electrical power to the high-voltage electrical load;

a first low-voltage output terminal configured for being connected to a first low-voltage electrical load of the electrical system, wherein a first subset of the series connected battery cells is configured for supplying low-voltage electrical power to the first low-voltage electrical load; and a second low-voltage output terminal configured for being connected to a second low-voltage electrical load of the electrical system, wherein a second subset of the series connected battery cells is configured for supplying low-voltage electrical power to the second low-voltage electrical load;

wherein the high-voltage battery pack comprises a plurality of individual high-voltage battery modules, each including at least one of said strings of series connected battery cells and a high-voltage output connection connected to the at least one string, wherein the high-voltage output connections of the plurality of high-voltage battery modules are connected in parallel and coupled to the high-voltage output terminal of the high-voltage battery pack, wherein at least one of said plurality of high-voltage battery modules comprises:

a first low-voltage output connection connected to the first low-voltage output terminal of the high-voltage battery pack, and said first subset of the series connected battery cells connected to the first low-voltage output connection, wherein at least one of said plurality of high-voltage battery modules comprises:

a second low-voltage output connection connected to the second low-voltage output terminal of high-voltage battery pack, and said second subset of the series connected battery cells connected to the second low-voltage output connection.

* * * * *